US012715545B2

(12) United States Patent
Fuss et al.

(10) Patent No.: US 12,715,545 B2
(45) Date of Patent: Aug. 25, 2026

(54) METHODS FOR CONTROLLING SHIFTING OF A BICYCLE

(71) Applicant: SRAM DEUTSCHLAND GmbH, Schweinfurt (DE)

(72) Inventors: Dominique Fuss, Euerdorf (DE); Sven Baumann, Grettstadt (DE); Sebastian Dueweling, Isny (DE); Kevin Wesling, Lombard, IL (US)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 62 days.

(21) Appl. No.: 18/884,284

(22) Filed: Sep. 13, 2024

(65) Prior Publication Data

US 2025/0108885 A1 Apr. 3, 2025

Related U.S. Application Data

(60) Provisional application No. 63/586,219, filed on Sep. 28, 2023.

(51) Int. Cl.
*B62M 25/08* (2006.01)
*B62M 25/00* (2006.01)

(52) U.S. Cl.
CPC ....... *B62M 25/08* (2013.01); *B62M 2025/003* (2013.01)

(58) Field of Classification Search
CPC ........................ B62M 25/08; B62M 2025/003
See application file for complete search history.

(56) References Cited

U.S. PATENT DOCUMENTS

| | | | |
|---|---|---|---|
| 4,490,127 | A | 12/1984 | Matsumoto |
| 5,261,858 | A | 11/1993 | Browning |
| 5,941,332 | A | 8/1999 | Dimick |
| 5,941,333 | A | 8/1999 | Sun et al. |
| 5,992,353 | A | 11/1999 | Posselt |
| 6,007,447 | A | 12/1999 | Lin |
| 6,012,538 | A | 1/2000 | Sonobe et al. |
| 6,047,230 | A | 4/2000 | Spencer et al. |
| 6,152,249 | A | 11/2000 | Li et al. |

(Continued)

FOREIGN PATENT DOCUMENTS

| | | |
|---|---|---|
| CN | 1515453 | 7/2004 |
| CN | 1530284 | 9/2004 |

(Continued)

*Primary Examiner* — Edwin A Young

(57) ABSTRACT

A method for controlling shifting of a bicycle includes identifying a first gear shift command for a first shift having a first shift direction and identifying a second gear shift command for a second shift having a second shift direction. The method includes determining a time period between the identifying of the first gear shift command and the identifying of the second gear shift command, and comparing, by the processor, the determined time period to a predetermined time period. When, based on the comparing, the determined time period is less than the predetermined time period, the method further includes initiating a shift in a second shift direction when the second shift direction and the first shift direction are a same shift direction, and blocking, by the processor, the shift in the second shift direction when the second shift direction and the first shift direction are different shift directions.

5 Claims, 14 Drawing Sheets

(56) References Cited

U.S. PATENT DOCUMENTS

| | | | | |
|---|---|---|---|---|
| 6,152,250 | A | 11/2000 | Shu | |
| 6,196,347 | B1 | 3/2001 | Chao et al. | |
| 6,216,078 | B1 | 4/2001 | Jinbo | |
| 6,276,479 | B1 | 8/2001 | Suzuki et al. | |
| 6,367,933 | B1 | 4/2002 | Chen et al. | |
| 6,569,045 | B1 | 5/2003 | Campagnolo | |
| 6,629,574 | B2 | 10/2003 | Turner | |
| 7,001,294 | B2 | 2/2006 | Fukuda | |
| 8,738,212 | B1 | 5/2014 | Schieffelin | |
| 8,874,338 | B2 | 10/2014 | Miglioranza | |
| 9,090,178 | B2 | 7/2015 | Tsuchizawa | |
| 9,114,850 | B2 | 8/2015 | Tanaka et al. | |
| 9,234,580 | B1 | 1/2016 | Usui et al. | |
| 9,260,035 | B2 | 2/2016 | Chun et al. | |
| 9,447,869 | B2 | 9/2016 | Tetsuka et al. | |
| 9,611,002 | B1 | 4/2017 | Shum et al. | |
| 9,656,672 | B2 | 5/2017 | Schieffelin | |
| 9,873,287 | B2 | 1/2018 | Eimura | |
| 10,189,306 | B2 | 1/2019 | Thoma | |
| 10,300,809 | B2 | 5/2019 | Lee | |
| 10,313,445 | B2 | 6/2019 | Ostergaard | |
| 10,358,133 | B2 | 7/2019 | Schieffelin | |
| 11,428,279 | B2 | 8/2022 | Choltco-Devlin | |
| 11,440,617 | B2 | 9/2022 | Kitano et al. | |
| 11,518,472 | B2 | 12/2022 | Hahn | |
| 2003/0234163 | A1 | 12/2003 | Ichida et al. | |
| 2004/0166972 | A1 | 8/2004 | Takeda et al. | |
| 2005/0075774 | A1 | 4/2005 | Takamoto et al. | |
| 2007/0232425 | A1 | 10/2007 | Ichida | |
| 2008/0121452 | A1 | 5/2008 | Bon | |
| 2009/0164076 | A1 | 6/2009 | Vasiliotis et al. | |
| 2009/0204299 | A1 | 8/2009 | Miglioranza | |
| 2009/0261652 | A1 | 10/2009 | Nakayama et al. | |
| 2012/0112739 | A1 | 5/2012 | Huang et al. | |
| 2012/0226400 | A1 | 9/2012 | Hsu | |
| 2013/0054065 | A1 | 2/2013 | Komatsu | |
| 2013/0054067 | A1 | 2/2013 | Shoge | |
| 2013/0054068 | A1 | 2/2013 | Shoge | |
| 2013/0267376 | A1 | 10/2013 | Takachi | |
| 2014/0015659 | A1* | 1/2014 | Tetsuka | B62M 9/122 340/432 |
| 2014/0088806 | A1 | 3/2014 | Lee | |
| 2014/0166383 | A1 | 6/2014 | Arimune | |
| 2015/0088389 | A1 | 3/2015 | Gao | |
| 2015/0307157 | A1 | 10/2015 | Gao | |
| 2015/0337951 | A1 | 11/2015 | Tetsuka | |
| 2015/0360747 | A1 | 12/2015 | Robert | |
| 2016/0009275 | A1 | 1/2016 | Hieda et al. | |
| 2016/0031526 | A1 | 2/2016 | Watarai | |
| 2016/0039497 | A1 | 2/2016 | Mastracci | |
| 2016/0052594 | A1 | 2/2016 | Kimmich | |
| 2016/0072942 | A1 | 3/2016 | Lim | |
| 2016/0121198 | A1 | 5/2016 | Doerksen et al. | |
| 2016/0229487 | A1 | 8/2016 | Dasbach et al. | |
| 2016/0257373 | A1 | 9/2016 | Emura | |
| 2017/0106866 | A1 | 4/2017 | Schieffelin | |
| 2017/0158285 | A1* | 6/2017 | Tachibana | B62M 9/122 |
| 2017/0183056 | A1 | 6/2017 | Yamamoto | |
| 2017/0225742 | A1 | 8/2017 | Hancock et al. | |
| 2017/0247080 | A1 | 8/2017 | Tsuchizawa et al. | |
| 2017/0327184 | A1 | 11/2017 | Contello et al. | |
| 2018/0056812 | A1 | 3/2018 | Hamann | |
| 2018/0111661 | A1 | 4/2018 | Wesling | |
| 2018/0118305 | A1 | 5/2018 | Tsuchizawa | |
| 2018/0162475 | A1 | 6/2018 | Peng | |
| 2018/0197401 | A1 | 7/2018 | Khaligh | |
| 2018/0257736 | A1 | 9/2018 | Komatsu et al. | |
| 2018/0257737 | A1 | 9/2018 | Komatsu et al. | |
| 2019/0126759 | A1 | 5/2019 | Miller et al. | |
| 2019/0176930 | A1 | 6/2019 | Wiegel et al. | |
| 2019/0195341 | A1 | 6/2019 | Baumgaertner | |
| 2019/0249769 | A1 | 8/2019 | Hamed | |
| 2019/0300113 | A1 | 10/2019 | Wesling | |
| 2019/0337590 | A1 | 11/2019 | Jordan | |
| 2020/0079467 | A1 | 3/2020 | Takayama | |
| 2020/0407012 | A1* | 12/2020 | Kitano | B62K 25/286 |
| 2021/0031882 | A1 | 2/2021 | Tsuchizawa et al. | |
| 2021/0269120 | A1 | 9/2021 | Wesling | |
| 2022/0388601 | A1 | 12/2022 | Hahn | |
| 2023/0104630 | A1 | 4/2023 | Hahn | |
| 2024/0034431 | A1* | 2/2024 | Shahana | B62M 6/55 |
| 2024/0059372 | A1 | 2/2024 | Ljosne | |
| 2024/0300619 | A1* | 9/2024 | Kimura | B62M 9/132 |

FOREIGN PATENT DOCUMENTS

| | | |
|---|---|---|
| CN | 1600633 | 3/2005 |
| CN | 1241784 | 2/2006 |
| CN | 1740050 | 3/2006 |
| CN | 101244753 | 8/2008 |
| CN | 201390360 | 1/2010 |
| CN | 102346446 | 2/2012 |
| CN | 102745299 | 10/2012 |
| CN | 102897276 | 1/2013 |
| CN | 102963483 | 3/2013 |
| CN | 102963486 | 3/2013 |
| CN | 102963487 | 3/2013 |
| CN | 102991640 | 3/2013 |
| CN | 103507908 | 1/2014 |
| CN | 103569303 | 2/2014 |
| CN | 103661707 | 3/2014 |
| CN | 103661786 | 3/2014 |
| CN | 103786827 | 5/2014 |
| CN | 103979061 | 8/2014 |
| CN | 103991506 | 8/2014 |
| CN | 104108452 | 10/2014 |
| CN | 104340325 | 2/2015 |
| CN | 104443246 | 3/2015 |
| CN | 204236732 | 4/2015 |
| CN | 105292374 | 2/2016 |
| CN | 105314060 | 2/2016 |
| CN | 105460122 | 4/2016 |
| CN | 105501381 | 4/2016 |
| CN | 105539439 | 5/2016 |
| CN | 105564586 | 5/2016 |
| CN | 106184602 | 12/2016 |
| CN | 106604862 | 4/2017 |
| CN | 107000807 | 8/2017 |
| CN | 107074320 | 8/2017 |
| CN | 107128434 | 9/2017 |
| CN | 107428393 | 12/2017 |
| CN | 107585252 | 1/2018 |
| CN | 107738723 | 2/2018 |
| CN | 207000726 | 2/2018 |
| CN | 108016562 | 5/2018 |
| CN | 106314201 | 7/2018 |
| CN | 108284912 | 7/2018 |
| CN | 108622296 | 10/2018 |
| CN | 109018171 | 12/2018 |
| CN | 109018184 | 12/2018 |
| DE | 202015103054 | 8/2015 |
| DE | 102017009847 | 4/2018 |
| DE | 102016225489 | 6/2018 |
| DE | 102020001018 | 8/2020 |
| EP | 1295786 | 3/2003 |
| EP | 1518785 | 3/2005 |
| EP | 3133311 | 6/2016 |
| EP | 3072797 | 9/2016 |
| EP | 2724925 | 1/2017 |
| EP | 3127799 | 2/2017 |
| EP | 3150470 | 4/2017 |
| EP | 3168124 | 5/2017 |
| EP | 4098533 | 12/2022 |
| JP | 2002019685 | 1/2002 |
| JP | 2010055261 | 3/2010 |
| JP | 2010120569 | 6/2010 |
| JP | 3199830 | 9/2015 |
| KR | 20110131002 | 12/2011 |
| KR | 101885715 | 9/2018 |
| TW | 201204596 | 2/2012 |
| TW | 201313547 | 4/2013 |
| TW | 201313549 | 4/2013 |
| TW | 201412600 | 4/2014 |
| TW | 201416288 | 5/2014 |

(56) References Cited

FOREIGN PATENT DOCUMENTS

| | | |
|---|---|---|
| TW | 201437089 | 10/2014 |
| TW | 201500259 | 1/2015 |
| TW | 201512024 | 4/2015 |
| TW | 201512025 | 4/2015 |
| TW | 201634346 | 10/2016 |
| TW | M548125 | 9/2017 |
| TW | 201800301 | 1/2018 |
| TW | 201811616 | 4/2018 |
| TW | 201815620 | 5/2018 |
| TW | 201815623 | 5/2018 |
| TW | 201817638 | 5/2018 |
| TW | 201823092 | 7/2018 |
| TW | 201823102 | 7/2018 |
| TW | 201904809 | 2/2019 |
| TW | 202300393 | 1/2023 |
| WO | 2011072942 | 6/2011 |
| WO | 2011078546 | 6/2011 |
| WO | 2012093435 | 7/2012 |
| WO | 2015073791 | 5/2015 |
| WO | 2016130833 | 8/2016 |
| WO | 2016177084 | 11/2016 |
| WO | 2017217936 | 12/2017 |

* cited by examiner

METHODS FOR CONTROLLING SHIFTING OF A BICYCLE

This application claims the benefit of U.S. Provisional Patent Application 63/586,219, filed Sep. 28, 2023, the contents of which are hereby incorporated by reference in its entirety.

BACKGROUND

1. Field of the Disclosure

The present disclosure is generally directed to an electric bicycle, and more particularly, to control of the electric bicycle.

2. Description of Related Art

A bicycle with a pedal assist electric motor (e.g., an electric bicycle or an ebike) may include wheel speed and crank speed sensors that may be used as inputs to automatic shifting algorithms for a transmission of the bicycle. The pedal assist motor may turn a driving chainring independent of cranks of the bicycle. This aspect exists so that when the assist motor is active, the rider does not sense motor torque in the legs of the rider if the rider slows a pedaling rate faster than the assist motor may react.

SUMMARY

In one example, a method for controlling shifting of a bicycle includes identifying, by a processor, a first gear shift command. A source of the first gear shift command is a control device of the bicycle. The method includes determining, by the processor, a first shift direction based on the first gear shift command and initiating, by the processor, a first shift of the bicycle in the first shift direction based on the first gear shift command. The method includes identifying, by the processor, a second gear shift command. A source of the second gear shift command is the processor or another processor. The second gear shift command is after the first gear shift command. The method includes determining, by the processor, a second shift direction based on the second gear shift command, determining, by the processor, a time period between the identifying of the first gear shift command and the identifying of the second gear shift command, and comparing, by the processor, the determined time period to a predetermined time period. When, based on the comparing, the determined time period is less than the predetermined time period, the method further includes initiating, by the processor, a shift of the bicycle in the second shift direction when the second shift direction and the first shift are a same shift direction, and blocking, by the processor, the shift of the bicycle in the second shift direction when the second shift direction and the first shift direction are different shift directions.

In one example, identifying the second gear shift command comprises generating, by the processor, the second gear shift command based on an automatic shifting algorithm.

In one example, identifying the first gear shift command comprises receiving, by the processor, the first gear shift command from the control device of the bicycle in response to a user input at an input device of the control device of the bicycle.

In one example, the method further includes starting a timer after the identifying of the first gear shift command. Determining the time period includes determining the time period based on the timer.

In one example, the method further includes when, based on the comparing of the determined time period to the predetermined time period, the determined time period is less than the predetermined time period, determining a cadence of a crank arm of the bicycle, comparing the determined cadence of the crank arm to a cadence setpoint. The comparing of the determined cadence of the crank arm to the cadence setpoint includes determining a difference between the determined cadence of the crank arm and the cadence setpoint. The method further includes when, based on the comparing of the determined time period to the predetermined time period, the determined time period is less than the predetermined time period, comparing the determined difference to a predetermined threshold difference and removing the blocking when, based on the comparing of the determined difference to the predetermined threshold difference, the determined difference is greater than the predetermined threshold difference, such that the shift of the bicycle in the second shift direction when the second shift direction and the first shift direction are different is allowed.

In one example, a method for controlling shifting of a bicycle includes identifying, by a processor, wheel speed data for a wheel of the bicycle. The wheel speed data represents a speed of the wheel at a plurality of time points. The method includes calculating, by the processor, an acceleration of the bicycle based on the identified wheel speed data, identifying, by the processor, additional acceleration data for the bicycle, and comparing, by the processor, the calculated acceleration of the bicycle to the identified additional acceleration data. The method includes blocking or allowing a shift of the bicycle based on the comparing.

In one example, identifying the additional acceleration data includes identifying a predetermined maximum threshold acceleration value and a predetermined minimum threshold acceleration value. Comparing the calculated acceleration of the bicycle to the identified additional acceleration data includes comparing the calculated acceleration of the bicycle to the predetermined maximum threshold acceleration value and the predetermined minimum threshold acceleration value. The predetermined minimum threshold acceleration value being a predetermined maximum threshold deceleration value. Blocking or allowing the shift of the bicycle based on the comparing includes blocking the shift of the bicycle when, based on the comparing of the calculated acceleration of the bicycle to the predetermined maximum threshold acceleration value and the predetermined minimum threshold deacceleration value, the calculated acceleration of the bicycle is greater than the predetermined maximum threshold acceleration value or the calculated acceleration of the bicycle is less than the predetermined minimum threshold acceleration value.

In one example, the blocking includes blocking the shift of the bicycle for a predetermined time period.

In one example, the calculated acceleration of the bicycle is a first acceleration of the bicycle. Identifying the additional acceleration data includes receiving, by the processor, acceleration data from an acceleration sensor of the bicycle at the plurality of time points, and calculating, by the processor, a second acceleration of the bicycle based on the received acceleration data. The comparing includes comparing the first acceleration of the bicycle to the second acceleration of the bicycle.

In one example, the comparing further includes calculating, by the processor, a ratio of the first acceleration of the bicycle to the second acceleration of the bicycle and comparing, by the processor, the calculated ratio to a predetermined minimum threshold ratio and a predetermined maximum threshold ratio. The method further includes identifying a blocking condition or a slipping condition based on the comparing of the calculated ratio to the predetermined minimum threshold ratio and the predetermined maximum threshold ratio. Identifying the blocking condition or the slipping condition includes identifying, by the processor, the blocking condition when, based on the comparing of the calculated ratio to the predetermined minimum threshold ratio, the calculated ratio is less than the predetermined minimum threshold ratio, and the first acceleration is less than zero, and identifying, by the processor, the slipping condition when, based on the comparing of the calculated ratio to the predetermined maximum threshold ratio, the calculated ratio is greater than the predetermined maximum threshold ratio, and the first acceleration is greater than zero.

In one example, the blocking or allowing includes, when the blocking condition or the slipping condition is identified, identifying, by the processor, a first time point, the first time point being a time point at which the blocking condition or the slipping condition is identified, and identifying, by the processor, the speed of the wheel at the first time point based on the wheel speed data. The blocking or allowing includes, when the blocking condition or the slipping condition is identified, calculating, by the processor, a translative acceleration of the bicycle at the first time point and at a second time point based on the acceleration data received from the acceleration sensor, the second time point being after the first time point, and calculating, by the processor, a translative speed of the bicycle at the second time point based on the identified speed of the wheel at the first time point, the calculated translative acceleration of the bicycle at the first time point, the calculated translative acceleration of the bicycle at the second time point, and a time period between the first time and the second time. The blocking or allowing includes, when the blocking condition or the slipping condition is identified, using the calculated translative speed of the bicycle within an automatic shifting algorithm, such that the shift is allowed.

In one example, the ratio is a first ratio. The first ratio is calculated for a first time point of the plurality of time points. The method further includes calculating, by the processor, a second ratio of the first acceleration of the bicycle to the second acceleration of the bicycle. The second ratio is calculated for a second time point of the plurality of time points. The second time point is after the first time point. The method further includes comparing, by the processor, the calculated second ratio to the predetermined minimum threshold ratio and the predetermined maximum threshold ratio, and identifying, by the processor, an end of blocking condition or the slipping condition when, based on the comparing of the calculated second ratio to the predetermined minimum threshold ratio and the predetermined maximum threshold ratio, the calculated second ratio is greater than the predetermined minimum threshold ratio and less than the predetermined maximum threshold ratio.

In one example, a method for controlling shifting of a bicycle includes identifying, by a processor, a first gear shift command, determining, by the processor, a first shift direction based on the first gear shift command, and initiating, by the processor, a first shift of the bicycle in the first shift direction based on the first gear shift command. The method includes identifying, by the processor, a second gear shift command before the first shift of the bicycle is complete, identifying, by the processor, a number of link pass by events between the initiating of the first shift of the bicycle and the identifying of the second gear shift command, and comparing, by the processor, the identified number of link pass by events to at least one predetermined threshold number of link pass by events. The method includes, based on the comparing, initiating or delaying the initiating, by the processor, a second gear shift of the bicycle based on the second gear shift command.

In one example, the method further includes identifying, by the processor, a second gear shift direction based on the second gear shift command. The comparing includes, when the identified second gear shift direction is a same direction as the identified first gear shift direction, comparing, by the processor, the identified number of link pass by events to a first predetermined threshold number of link pass by events. The at least one predetermined threshold number of link pass by events includes the first predetermined threshold number of link pass by events. The comparing includes, when the identified second gear shift direction is a different direction than the identified first gear shift direction, comparing, by the processor, the identified number of link pass by events to a second predetermined threshold number of link pass by events. The at least one predetermined threshold number of link pass by events includes the second predetermined threshold number of link pass by events. The second predetermined threshold number of link pass by events is greater than the first predetermined threshold number of link pass by events.

In one example, initiating or delaying the initiating, by the processor, of the second gear shift of the bicycle based on the second gear shift command includes, when the identified second gear shift direction is the same direction as the identified first gear shift direction, initiating the second gear shift of the bicycle when, based on the comparing, the identified number of link pass by events is greater than the first predetermined threshold number of link pass by events, and delaying the second gear shift of the bicycle when, based on the comparing, the identified number of link pass by events is less than the first predetermined threshold number of link pass by events. The initiating or delaying the initiating, by the processor, of the second gear shift of the bicycle based on the second gear shift command includes, when the identified second gear shift direction is a different direction than the identified first gear shift direction, initiating the second gear shift of the bicycle when, based on the comparing, the identified number of link pass by events is greater than the second predetermined threshold number of link pass by events, and delaying the second gear shift of the bicycle when, based on the comparing, the identified number of link pass by events is less than the second predetermined threshold number of link pass by events.

In one example, when the second gear shift is delayed, the method further includes incrementing, by the processor, a shift counter, and after the first gear shift is complete, for each shift identified by the shift counter, repeating the identifying of the first gear shift command, with an oldest delayed gear shift command being the first gear shift command, the determining, the initiating of the first shift of the bicycle, identifying whether a new second gear shift command is received before the first shift of the bicycle is complete, and when the new second gear shift command is received, the identifying of the number of link pass by events, the comparing, and the initiating or delaying the initiating.

In one example, the comparing includes comparing, by the processor, the identified number of link pass by events to a predetermined threshold number of link pass by events of the at least one predetermined threshold number of link pass by events. The predetermined threshold number of link pass by events being zero link pass by events. Based on the comparing, the initiating or delaying the initiating includes, when, based on the comparing, the identified number of link pass by events is equal to zero, initiating the second gear shift of the bicycle based on the second gear shift command.

In one example, a method for controlling shifting of a bicycle includes identifying, by a processor, a target cadence, identifying, by the processor, a static cadence offset based on a gear in which the bicycle is operated, and determining, by the processor, a static cadence window based on the identified target cadence and the identified static cadence offset. The static cadence window has an upper limit and a lower limit. The method includes identifying, by the processor, a cadence at a crank arm of the bicycle, identifying, by the processor, a torque at the crank arm of the bicycle, a speed of the bicycle, an acceleration of the bicycle, or any combination thereof, and identifying, by the processor, a riding scenario of the bicycle based on the identified torque, the identified cadence, the identified speed, the identified acceleration, or any combination thereof. The method includes comparing, by the processor, the identified cadence at the crank arm of the bicycle to the static cadence window, determining, by the processor, a dynamic offset based on the identified riding scenario, and adding, by the processor, the determined dynamic offset to the upper limit of the static cadence window when, based on the comparing, the identified cadence at the crank arm is equal to the upper limit of the static cadence window, such that an automatic shift otherwise initiated with an automatic shifting algorithm based on the static cadence window is avoided.

In one example, the method further includes decaying, by the processor, the dynamic offset over time.

In one example, when the riding scenario is identified as riding on a first type of terrain, determining the dynamic offset based on the identified riding scenario includes determining a first dynamic offset. When the riding scenario is identified as riding on a second type of terrain, determining the dynamic offset based on the identified riding scenario includes determining a second dynamic offset. The first type of terrain is technically more complex than the second type of terrain, and the first dynamic offset is greater than the second dynamic offset.

In one example, identifying the torque at the crank arm of the bicycle, the speed of the bicycle, the acceleration of the bicycle, or any combination thereof includes identifying, by the processor, the torque at the crank arm of the bicycle. Determining the target cadence includes identifying, by the processor, a static target cadence, determining, by the processor, a rider input based on the identified torque at the crank arm of the bicycle, and comparing, by the processor, the determining rider input to a predetermined threshold rider input. determining the target cadence includes determining, by the processor, the target cadence based on the comparing of the determined rider input to the predetermined rider input. The determining of the target cadence includes dynamically adjusting, by the processor, the identified static target cadence when, based on the comparing of the determined rider input to the predetermined threshold rider input, the determined rider input becomes greater than or less than the predetermined threshold rider input.

In one example, a method for controlling an electric bicycle includes identifying, by a processor, a change in inclination of a surface on which the electric bicycle is being ridden. The change in inclination is from a decline to an incline. The method includes instructing, by the processor, an assist motor of the electric bicycle to operate at an increased output power based on the identified change in inclination.

In one example, identifying the change in inclination includes receiving, by the processor, inclination data from an inclination sensor of the electric bicycle and identifying the change in inclination based on the received inclination data, or receiving, by the processor, distance data from a laser distance measurement sensor and identifying the change in inclination based on the received distance data. The laser distance measurement sensor is configured to measure a distance from the electric bicycle to a point in front of the electric bicycle.

In one example, instructing the assist motor of the electric bicycle to increase the output power includes instructing, by the processor, the assist motor of the electric bicycle to operate at the increased output power for a predetermined period of time, or identifying, by the processor, a current gear in which the electric bicycle is being operated, identifying, by the processor, a target gear identified by an automatic shifting algorithm, and instructing, by the processor, the assist motor of the electric bicycle to operate at the increased output power until the current gear matches the target gear.

In one example, the method further includes identifying, by the processor, user input at the electric bicycle and stopping, by the processor, the instructing of the assist motor of the electric bicycle to operate at the increased output power based on the identified user input. The identified user input is depression of a brake control device of the electric bicycle or a manual shift override.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
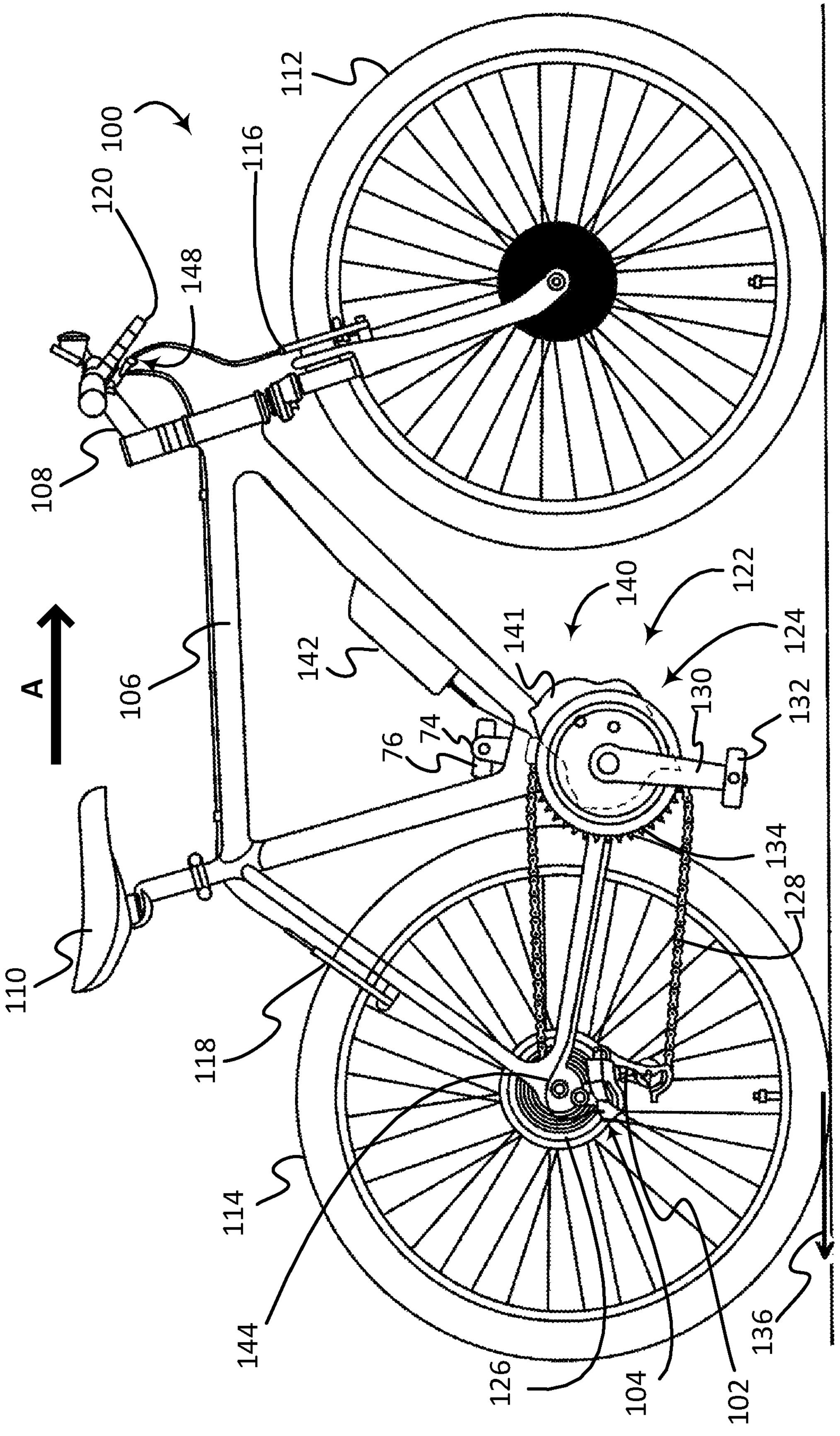
FIG. 1 shows a side view of one example of a bicycle with component motion that may be controlled in accordance with the teachings of this disclosure.

A bicycle with an electric pedal assist motor capable of driving a chainring independent of cranks (e.g., an electric bicycle or an e-bike) is provided. The bicycle includes wheel speed sensors and crank cadence sensors. The wheel speed sensors and the crank cadence sensors measure wheel speed and crank cadence, respectively, and provide the measured wheel speed and crank cadence to an electric rear derailleur or a controller of the bicycle. The electric rear derailleur, for example, is configured to instruct an e-bike controller to activate motor overdrive based on the measured wheel speed and/or the measured crank cadence.

The rear derailleur, for example, and, more specifically, shifting by the rear derailleur may be configured based on a selected ride mode. The ride mode may be selected from a number of different ride modes, and the controller or another controller of the bicycle may switch between two or more of the different ride modes. Within each of the different ride modes, characteristics of the shifting such as, for example, gear hysteresis, a minimum gear to shift to without pedaling, and/or other characteristics may be adjusted.

To avoid chain breaking or cassette damage, the chain getting crossed over two or more cogs while shifting is to be avoided. If two or more shifts are triggered in a short period of time, the rear derailleur is configured to pause for a predetermined period of time to avoid the chain being pulled over the cassette unsynchronized with shift locations.

The present embodiments provide a synchronization method, in which shift requests (e.g., from an automatic shifting algorithm or a rider-generated request) are only processed when a drivetrain of the electric bicycle is ready for a shift. Knowing characteristics of the cassette, a worst-case number of chain links passing-by a particular location on the electric bicycle until the chain is engaged in a target cog and ready to process a new shift-request is defined.

A processor of the electric bicycle counts the chain links passing by based on data from a sensor (e.g., a chainring angle sensor). In one embodiment, the processor may determine a number of chain links that has passed by based on this counting. In another embodiment, the processor may determine the number of chain links that has passed by based on a relative encoder position of a rotor of an assist motor of the electric bicycle, a gear-ratio, and a size of a chainring of the electric bicycle.

When a new shift is processed (e.g., when the rear derailleur starts moving), the processor goes into a shifting state and rejects further shift-requests while in the shifting state. When the count of the chain links passed is equal to a predefined number of links passed, and the chain has moved to a next cog, the processor goes into a ready for next shift state and is configured to process further shift-requests.

In automatic shifting, a processor executing an automatic shifting algorithm may trigger an outboard shift as soon as wheel speed or cadence has reached a limit value. A rider accelerating over a slippery ground will reach the limit value, and the automatic shifting algorithm may initiate an outboard shift. This, on a slippery ground, may lead to more slip, and the processor may be configured to trigger one or more additional outboard shifts until the rider loses control over the bicycle.

In automatic shifting, the processor executing the automatic shifting algorithm may trigger an inboard shift when the wheel speed decreases. When the wheel is being blocked (e.g., during full brake application) for a period of time, the cassette cannot rotate, but the processor may be configured to trigger one or more inboard shifts.

The present embodiments provide a method for detecting slipping and/or blocking based on abnormal acceleration values. The abnormal acceleration values are detected by a wheel speed sensor and/or a cadence sensor. The processor is configured to block a shift (e.g., an automatic shift) based on the detected abnormal acceleration values.

Additional filtering may be applied to signals from the wheel speed sensor and/or the cadence sensor. Detection thresholds for the slipping and/or the blocking may be tuned based on, for example, maximum achievable acceleration under ideal conditions and/or maximum achievable deceleration when braking under ideal conditions, respectively. The processor may adapt and/or learn for detecting the slipping and/or the blocking based on other inputs such as rider power and motor power, system weight, a gradient, and/or other parameters. Additional sensors for detecting brake actuation by the user may also be provided.

On a bicycle (e.g., an electric bicycle) with automatic shifting, the rider may at any time execute one or multiple manual shifts that have priority over shift decision of the automatic shifting algorithm. Current solutions use a manual override time to avoid the automatic system undoing the manual shift(s) executed by the rider. If the rider executes a manual shift and the automatic shifting algorithm is paused (e.g., blocked out) for the manual override time, a second automatic shift may not follow within the manual override time even if appropriate (e.g., when the rider is accelerating). The rider may pedal at a high cadence or need to keep up by executing manual shifts. Keeping up with the manual shifts may cause the continued pausing (e.g., blocking) of the automatic shifting algorithm. The automatic shifting may essentially become inactive over an extended period of time.

In the present embodiments, when a manual shift (e.g., a manual override) is executed, an automatic shift request to an opposite direction is blocked for a predetermined amount of time, while an automatic shift request to a same direction is still processed. For example, a manual inboard shift before going into a climb may be assisted by one or more additional automatic inboard shifts when the electric bicycle, for example, decelerates without needing to wait for the predetermined amount of time (e.g., an override time) to pass. Outboard shifts (e.g., due to high speed), however, are blocked during the predetermined amount of time. The predetermined amount of time (e.g., the override time) may be a fixed time (e.g., 7 seconds) or may be variable depending on a ride situation, a terrain, or a rider input.

Turning now to the drawings, FIG. 1 illustrates an example bicycle 100 (e.g., e-bike) that may be used to implement a connection to a gear changer 102 using an intermediate power connector 104. In the illustrated embodiment, the bicycle 100 includes a frame 106, handlebars 108, and a seat 110. The bicycle 100 also includes a first or front wheel 112 and a second or rear wheel 114. A front brake 116 and/or a rear brake 118 are included to brake the front wheel 112 and the rear wheel 114, respectively. The front brake 116 and/or the rear brake 118 are controlled by at least one brake actuator 120. The bicycle 100 includes a drive train 122. The drive train 122 of FIG. 1 includes a crank assembly 124 operatively coupled to a rear cassette 126 via a chain 128. The crank assembly includes crank arms 130 and pedals 132, as well as at least one chainring 134 configured to operatively couple with the chain 128 to transmit force and/or power exerted onto the crank assembly 124 to the chain 128. This force and/or power is transmitted to the rear cassette 126 by the chain 128, whereby a motivating force 136 and/or power is transmitted to the rear wheel 114 from the rear cassette 126. While the drive train 122 includes the gear changer (e.g., a rear derailleur 102 in the illustrated embodiment), other transmissions such as an internal gear hub, a gear box, and/or a continuously variable transmission may be applied to the bicycle 100.

The drive train 122 may also include a power assist device 140. Pedaling torque is applied to the crank assembly 124 by a rider using the pedals 132 and crank arms 130. The power assist device 140 is configured to assist the rotation of the rear wheel 114. In the illustrated embodiment, the power assist device 140 is configured to assist the rotation of the wheel rear 114 via a coupled connection to the crank assembly 124. The power assist device 140 includes a power assist motor 141 that is powered by a remote power source 142.

The chain 128 may be moved between individual sprockets of the rear cassette 126 using the gear changer, such as the rear derailleur 102, as shown in FIG. 1. The rear derailleur 102, for example, is an electric gear changer that is controlled by signals indicating that a shift command has been actuated by the bicycle operator, or rider. The electric rear derailleur 102 may be alternatively powered by an integrated power source or a remote power source 142, using a power conductive connector or cable 144. The power is provided from the remote power source 142 through the cable 144 to the intermediate power connector 104 that is coupled to the rear derailleur 102. The shift commands are implemented using an electric actuator 148 that is manually operable by the rider. The signals indicating the shift commands may be communicated to the electric rear derailleur 102 using wired and/or wireless communication techniques.

Figure 2:
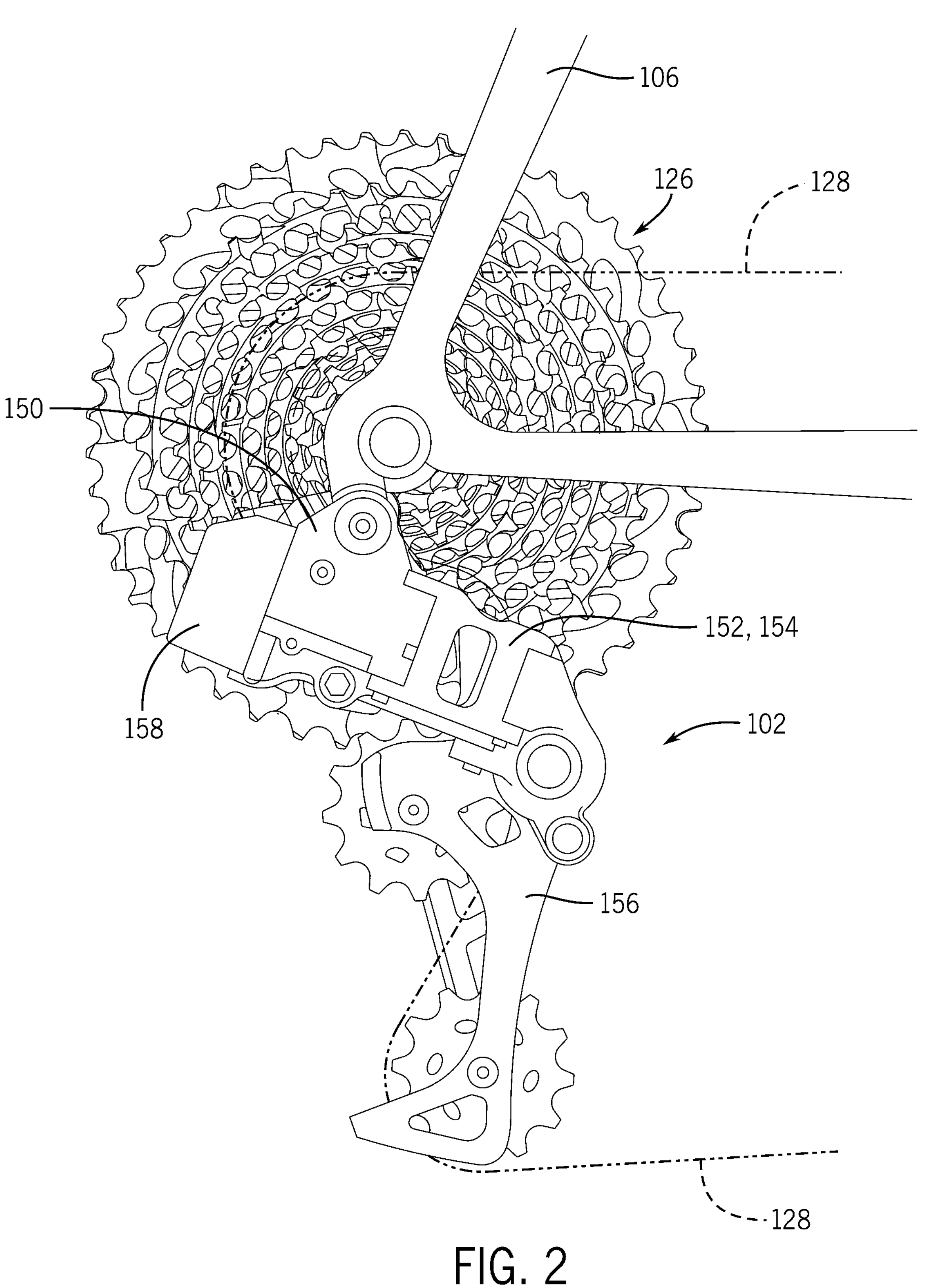
FIG. 2 is a side view of one example of a rear derailleur.

Referring to FIG. 2, the rear derailleur 102 is attached to the bicycle frame 106 and positioned next to the rear cassette 126. The chain 128 is only schematically shown in dashed lines. The electric, or electromechanical, rear derailleur 102 includes a base member 150 (e.g., a "b-knuckle"), an outer link 152, and an inner link 154. The base member 150 is attachable to the bicycle frame 106 in a conventional manner. The inner link 154 is pivotally attached to the base member 150 by link pins, for example. A moveable member or assembly 156 (e.g., a "p-knuckle") is pivotally connected to the outer link 152 and the inner link 154 at an end opposite the base member 150 to permit displacement of the moveable assembly 156 relative to the base member 150.

The rear derailleur 102 may also be configured to work with an integrated power source 158, such as a removable battery. In the examples shown in FIGS. 1 and 2, the integrated power source or battery 158 is attached to the rear derailleur 102. The integrated power source 158 may power, for example, a motor of the rear derailleur 102 used to shift the rear derailleur 102. The intermediate power connector 104 may include an interface with the rear derailleur 102 that includes interface features similar to the removable battery 158 in order to electrically connect to the derailleur 102. This interface may have a portion that is removably connectable or coupleable to the rear derailleur 102. The intermediate power connector 104, or at least a connecting portion thereof, may also be smaller than the removable battery 158. As the intermediate power connector 104 transmits power from the remote battery or power source 142, the intermediate power connector 104 may include circuitry for transforming the electrical energy provided by the remote battery 142 into a form that is usable by the derailleur 102. For example, the intermediate power connector 104 may include circuitry for voltage reduction, voltage rectification, as well as other power transformation circuitry and/or devices or combinations thereof. In an embodiment, the intermediate power connector 104 may also include communication circuitry and/or other devices. For example, the intermediate power connector 104 may include a wireless transmitter and/or receiver, CANbus to wireless translator, wired data connector, a CANbus to derailleur protocol translator, and/or other devices or circuitry and combinations thereof.

As shown, the bicycle 100 also has a handlebar mounted user interface, by way of the shift actuator or electric actuator 148. All of these components may be connected to the remote power source or remote battery 142. Additionally, all the communication between the e-bike central control system or controller, and each component is achieved through wired or wireless communication. There may be discrete control with individual wires from the central controller to each component or the system may use a controller area network ("CAN") bus designed to allow microcontrollers and devices to communicate with each other in applications.

While the illustrated bicycle 100 is a mountain bicycle and may include suspension components, such as a shock absorbing front fork, the embodiments disclosed herein may be implemented with other types of bicycles such as, for example, road bicycles. The front and/or forward orientation of the bicycle 100 is indicated by the direction of the arrow "A" in FIG. 1. As such, a forward direction of movement of the bicycle is indicated by the direction of the arrow A.

An e-bike central control system or controller may be supported by a same housing as the remote power source 142. The e-bike controller may control power from the remote power source 142 to components on the bicycle 100 such as, for example, the power assist device 140. The e-bike controller may control power to other and/or different components on the bicycle 100. The e-bike controller may send signals (e.g., instructions) to and/or receive data (e.g., instructions and/or sensor data) from components on the bicycle 100 such as, for example, the derailleur 102, a suspension system, and/or a seat post assembly to actuate and/or control components of the bicycle 100.

In other embodiments, the e-bike controller may be located in other locations (e.g., mounted on the handlebars) on the bicycle 100 or, alternatively, may be distributed among various components of the bicycle 100, with routing of a communication link to accommodate necessary signal and power paths. The e-bike controller may also be located other than on the bicycle 100, such as, for example, on a rider's wrist or in a jersey pocket. The communication link may include wires, may be wireless, or may be a combination thereof. In one example, the e-bike controller may be integrated with the rear derailleur 102 to communicate control commands between components. The e-bike controller may include a processor, communication device (e.g., a wireless communication device), a memory, and one or more communication interfaces.

In one example, the controller of the derailleur and/or the e-bike controller wirelessly actuates a motor module of the derailleur 102 and/or an assist motor and operates the derailleur 102 for executing gear changes and gear selection. Additionally or alternatively, the controller of the derailleur and/or the e-bike controller may be configured to control gear shifting of a front gear changer.

Figure 3:
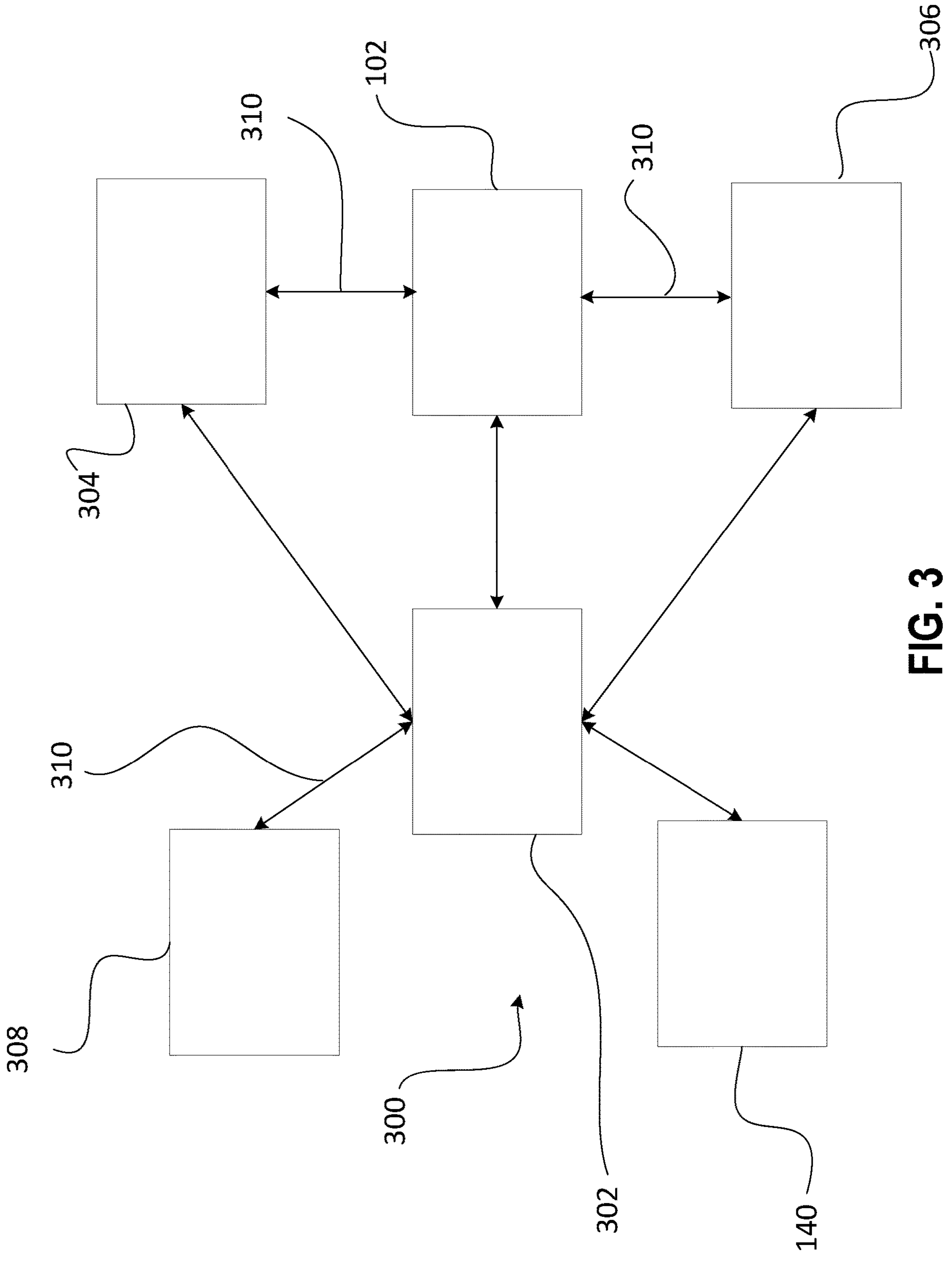
FIG. 3 is a block diagram of an embodiment of an electromechanical control system.

FIG. 3 shows an example of a control system 300 (e.g., an electromechanical control system) for the bicycle 100, for example. The control system 300 includes the e-bike controller 302, the power assist device 140, the rear derailleur 102, and one or more sensors. The power assist device 140 is, for example, an assist motor.

The one or more sensors include, for example, a pedal speed sensor 304, a wheel speed sensor 306, and a torque sensor 308. For example, the pedal speed sensor 304 measures a rotational speed of at least one of the crank arms 130, the wheel speed sensor 306 measures a rotational speed of at least one of the wheels 114, 112, and the torque sensor 308 measures a torque on the crank assembly 124 and/or a torque on an output shaft of the assist motor 140. The control system 300 may include more, fewer, and/or different sensors. For example, the one or more sensors may include more than one wheel speed sensor 306, one for the front wheel 112 and one for the rear wheel 114. As another example, the one or more sensors may include a chainring angle sensor, a link counter, one or more accelerometers, a global positioning system (GPS) sensor, an inclination sensor, a laser distance measurement sensor, and/or one or more other sensors.

The pedal speed sensor 304, the wheel speed sensor 306, and the torque sensor 308 may be any number of different types of sensors. For example, the pedal speed sensor 304 and the wheel speed sensor 306 may be a combined speed and cadence sensor. The speed and cadence sensor may include a spoke magnet attached to a spoke of the front wheel 112 or the rear wheel 114 and/or a cadence magnet attached to one of the crank arms 130, and a sensor attached to the frame 106 of the bicycle 100 (e.g., a Hall effect sensor). The sensor attached to the frame 106 of the bicycle is configured to identify and count rotations of the one crank arm 130 and/or the front wheel 112 or the rear wheel 114 based on the cadence magnet and/or the spoke magnet passing the sensor attached to the frame 106, respectively. Other types of sensors may be provided (e.g., a combination of a gyroscope and an accelerometer for the wheel speed sensor 306). The torque sensor 308 may include, for example, magnetoelastic torque sensors, strain gauges, SAW devices, and/or other types of torque sensors. In one embodiment, the torque sensor 308 is a current sensor that measures current through the assist motor 140. The amount of current consumed by the assist motor 140 is proportional to a torque the assist motor 140 applies to a drivetrain of the bicycle 100.

As shown in the embodiment of FIG. 3, the power assist device 140, the rear derailleur 102, and the one or more sensors (e.g., the pedal speed sensor 304, the wheel speed sensor 306, and the torque sensor 308) may be in direct communication with the e-bike controller 302. Alternatively or additionally, at least some components of the control system 300 may be in indirect communication with the e-bike controller 302. For example, the wheel speed sensor 306 and/or the pedal speed sensor 304 may be in direct communication with the rear derailleur 102 and indirect communication with the e-bike controller 302 via the rear derailleur 102. In one embodiment, each of at least the rear derailleur 102 and the e-bike controller 302 is in direct communication with all sensors of, for example, the pedal speed sensor 304, the wheel speed sensor 306, and the torque sensor 308. Other and/or different components of the control system 300 may be in direct communication with all sensors of the one or more sensors (e.g., the power assist device 140). Communication between the components of the control system 300 may be wired communication and/or wireless communication.

Each communication link 310 between the components of the control system 300 may be in both directions. In other words, data flow between components of the control system 300 in direct communication may be in both directions. For example, the wheel speed sensor 306 may receive signals from the e-bike controller 302 or the rear derailleur 102 (e.g., as to when to measure the rotational speed) and return the measured rotational speed to the e-bike controller 302 or the rear derailleur 102.

Figure 4:
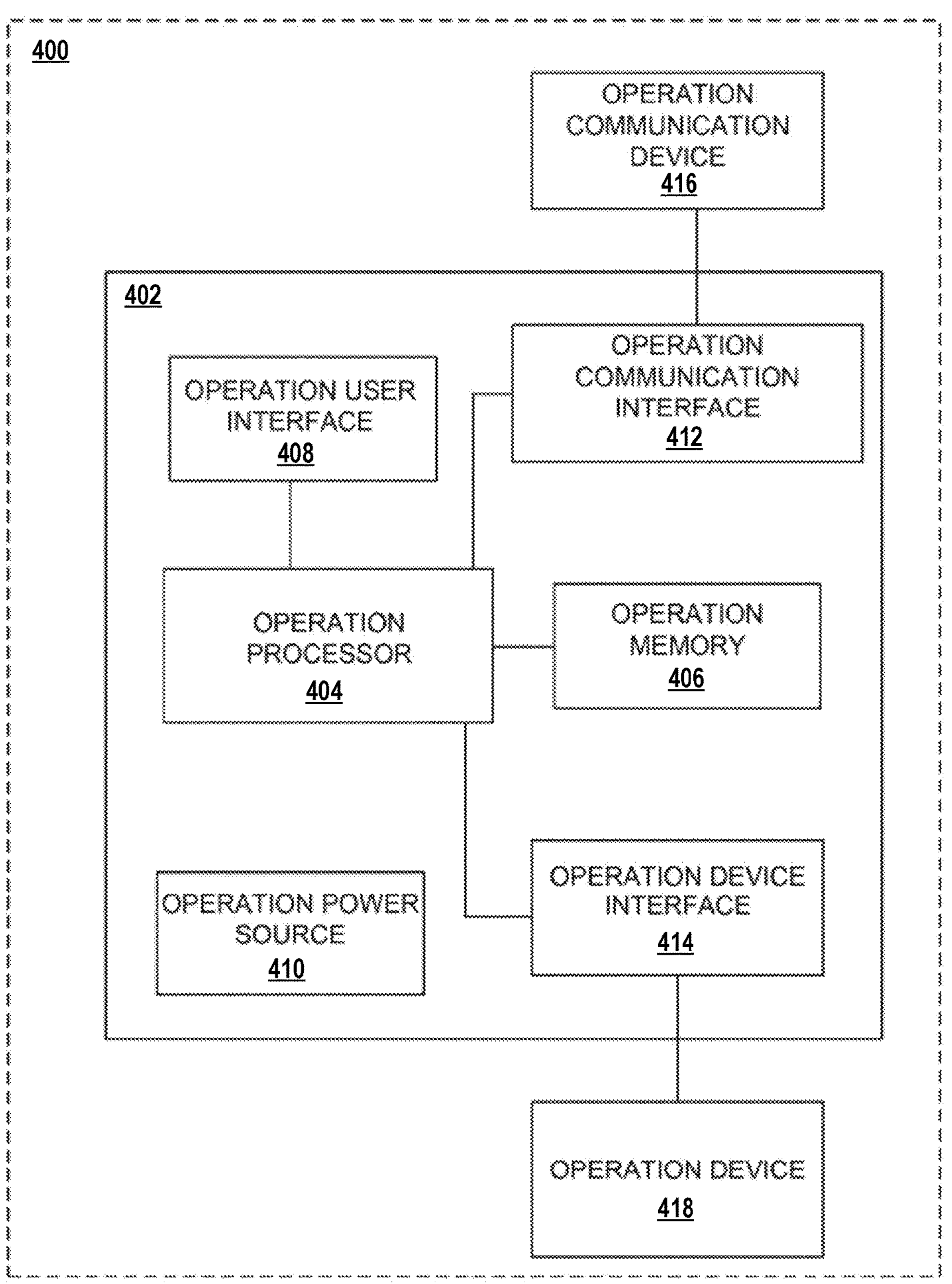
FIG. 4 is a block diagram of an operation component.

FIG. 4 is a block diagram of an operation component 400. The operation component 400 may be or may be part of one or more of the previously described components such as, for example, the rear derailleur 102, the e-bike controller 302, and a front gear changer. The operation component 400 may also be another component, such as the power assist device 140, an internal gearbox component, a suspension or an adjustable suspension component, or an adjustable seating component. A plurality of operation components 400 may be provided.

The operation component 400 is provided with an operation unit 402, which may be a circuit board or an alternative configuration. The operation unit 402 includes an operation processor 404, an operation memory 406, an operation user interface 408, an operation power source 410, an operation communication interface 412, and an operation device interface 414. In an embodiment, the operation communication interface 412 is in communication with an operation communication device 416 and the operation device interface 414 is in communication with an operation device 418. Additional, different, or fewer components may be provided. For example, the operation user interface 408 may be omitted.

The structure, connections, and functions of the operation processor 404 may be representative of those of the rear derailleur 102, the front derailleur, the ebike controller 302, or another component. The operation processor 404 may include a general processor, digital signal processor, an ASIC, FPGA, analog circuit, digital circuit, combinations thereof, or other now known or later developed processor. The operation processor 404 may be a single device or combinations of devices, such as through shared or parallel processing.

The operation memory 406 may be a volatile memory or a non-volatile memory. The operation memory 406 may include one or more of a ROM, a RAM, a flash memory, an EEPROM, or other type of memory. The operation memory 406 may be removable from the operation component 400, such as an SD memory card. In a particular non-limiting, example embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The operation memory 406 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

The operation power source 410 is a portable power source, which may be stored internal to the operation component 400 or stored external to the operation component 400 and communicated to the operation component through a power conductive cable. The operation power source 410 may involve the generation of electric power, for example using a mechanical power generator, a fuel cell device, photo-voltaic cells, piezoelectric, or other power-generating devices. The operation power source 410 may include a battery such as a device consisting of two or more electrochemical cells that convert stored chemical energy into electrical energy. The operation power source 410 may include a combination of multiple batteries or other power providing devices. Specially fitted or configured battery types, or standard battery types may be used.

In the example where the operation component 400 is the rear derailleur 102, the operation power source 410 may be stored internal to the operational component 400. In the example where the operation component 400 is the e-bike controller 302, the operation power source 410 may be stored internal or external to the operation component 400. For example, the e-bike controller 302 may be supported within a housing of the remote power source 142 of FIG. 1.

The operation device interface 414 provides for operation of a component of the bicycle 100. For example, the operation device interface 414 may transmit power from the operation power source 410 to generate movement in the operation device 418. In various embodiments, the operation device interface 414 sends power to control movement of the assist motor 140, a motor of the rear derailleur 102, a motor of the front derailleur, or any combination thereof. In one embodiment, the operation component 400 is the e-bike controller 302, and the operation device interface 414 sends power to control movement of the power assist device 140. The operation device interface 414 includes wired conductive signals and/or data communication circuitry operable to control the operation device 418.

The operation user interface 408 may be one or more buttons, keypad, keyboard, mouse, stylus pen, trackball, rocker switch, touch pad, voice recognition circuit, or other device or component for communicating data between a user and the operation component 400. The operation user interface 408 may be a touch screen, which may be capacitive or resistive. The operation user interface 408 may include an LCD panel, LED, LED screen, TFT screen, or another type of display. The operation user interface 408 may also include audio capabilities or speakers.

The operation communication interface 412 is configured to receive, with the operation communication device 416, data such as measurement data (e.g., rotational crank speed, rotational wheel speed, and/or torque), anticipation signals, operation signals, and/or other signals from bicycle components (e.g., the pedal speed sensor 304, the wheel speed sensor 306, and/or the torque sensor 308; the e-bike controller 302). In one embodiment, the operation component 400 includes more than one operation communication interface 412 in communication with more than one operation communication device 416, respectively. The operation communication interface 412 may also be configured to send data such as status signals (e.g., temperature sensor signals) for reception by, for example, the e-bike controller 302. The operation communication interface 412 communicates the data using any operable connection. An operable connection may be one in which signals, physical communications, and/or logical communications may be sent and/or received. An operable connection may include a physical interface, an electrical interface, and/or a data interface. One or more operation communication interfaces may provide for wireless communications through the operation communication device 416 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as components of the control system 300 (e.g., the e-bike controller 302 and the rear derailleur 102), and/or other components on the bicycle 100 and/or worn by the user. Further, in an example, non-limited embodiment, implementations may include distributed processing, component/object distributed processing, and parallel processing. Alternatively, virtual computer system processing may be constructed to implement one or more of the methods or functionality as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and the apparatus may also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data (e.g., magnetic, magneto optical disks, or optical disks). However, a computer need not have such devices. Moreover, a computer may be embedded in another device such as, for example, a mobile telephone, a personal digital assistant ("PDA"), a mobile audio player, a Global Positioning System ("GPS") receiver, a control unit, a rear derailleur, or a front gear changer, to name just a few. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory may be supplemented by, or incorporated in, special purpose logic circuitry.

The operation communication device 416 provides for data and/or signal communication from the operation component 400 to another component of the bicycle 100, or an external device such as a mobile phone or other computing device. The operation communication device communicates the data using any operable connection. An operable connection may be one in which signals, physical communications, and/or logical communications may be sent and/or received. An operable connection may include a physical interface, an electrical interface, and/or a data interface. The control communication device may be configured to communicate wirelessly, and as such includes one or more antennae. The control communication device provides for wireless communications in any now known or later developed format.

A control antenna may also be provided. The control antenna may be a plurality of control antennae. The operation component 400 may include an antenna with circuitry of a PCB of the operation component 400; however, additional antennae may also be included in the circuitry. The control antenna may be integrated with another component of the bicycle 100 or may be an independent component. For example, the control antenna may be integrated as part of the e-bike controller 300 and/or as part of the rear derailleur 102.

The derailleur 102 may allow configuration of a number of ride modes that may be switched between by a control unit (e.g., the e-bike controller 302 or another controller on or outside of the bicycle 100). The control unit may switch the ride mode based on user input (e.g., via the electric actuator 148 or another interface) or automatically based on sensed conditions. In each mode, various characteristics of the ride mode may be adjusted. For example, gear hysteresis, minimum gear to shift to without pedaling, and/or other characteristics may be adjusted.

Figure 5:
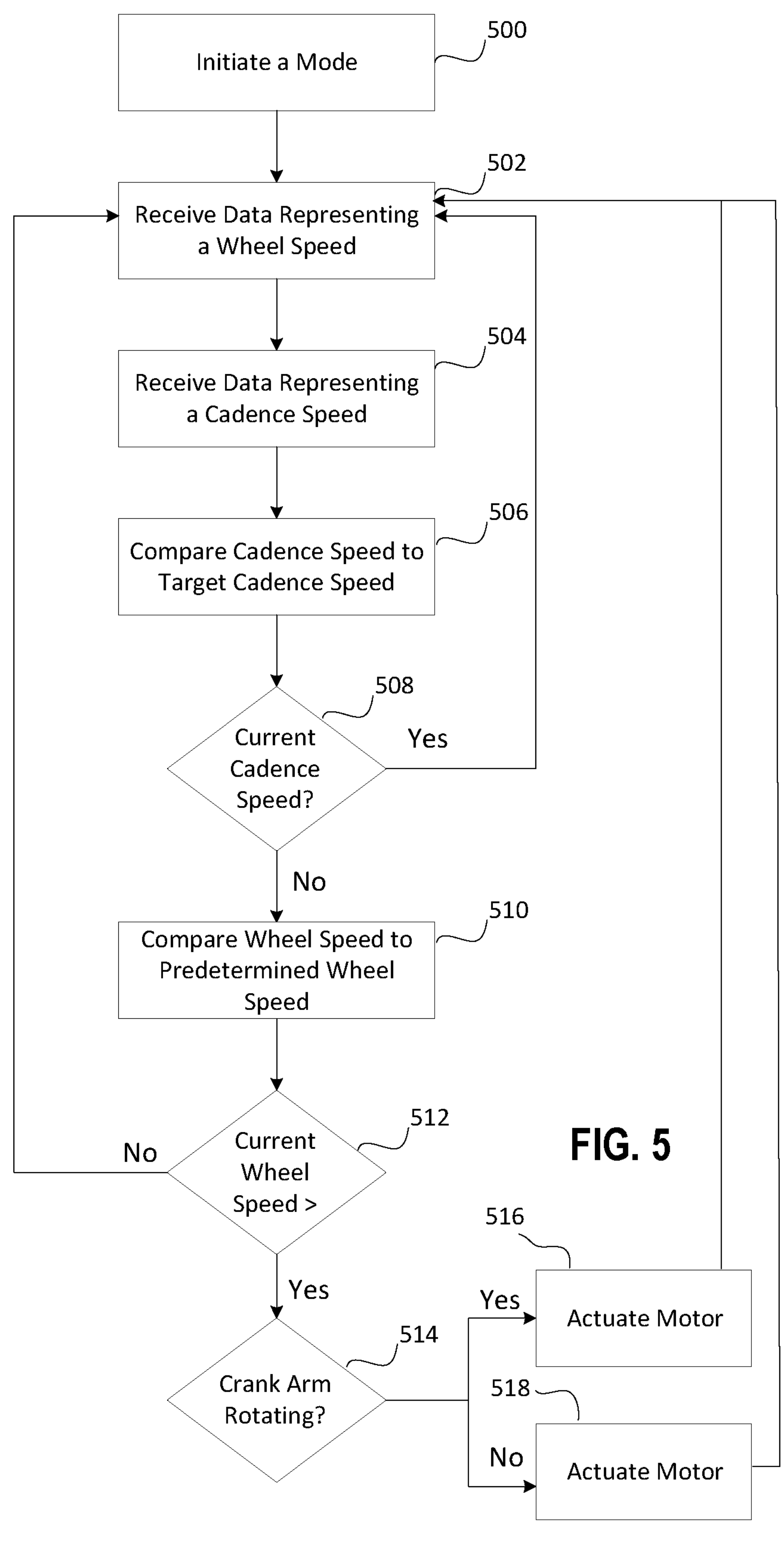
FIG. 5 is a flowchart of an embodiment of a method for automatic shifting.

FIG. 5 is a flowchart of an embodiment of a method for electromechanical control of components of the bicycle 100, for example. The flowchart also illustrates a method for transmitting and receiving wireless signals on the bicycle 100. As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 102, the e-bike controller 302, the power assist device 140, the one or more sensors, or any combination thereof. Additional, different, or fewer acts may be provided. The acts are performed in the order shown or in other orders. The acts may be repeated.

In act 500, a processor initiates a mode (e.g., a full automatic mode) for a bicycle. In the full automatic mode, a derailleur (e.g., the derailleur 102) is shifted without user input to maintain a gear that results in a rider cadence close to a defined target based on a current wheel speed. The processor may initiate the full automatic mode based on user input or automatically based on sensed riding conditions. In one embodiment, the processor is a processor of the derailleur and initiates the full automatic mode based on instructions from another processor that received the user input or identified the sensed riding conditions (e.g., the e-bike controller 302).

In act 502, the processor receives data representing a wheel speed from a sensor (e.g., a wheel speed sensor; the wheel speed sensor 306). The wheel speed sensor measures rotational speed of a wheel continuously or at a predetermined interval. The received data representing the wheel speed may be for a front wheel of the bicycle and/or a rear wheel of the bicycle. The data representing the wheel speed may be a rotational speed value (e.g., in revolutions per minute).

In act 504, the processor receives data representing a cadence speed from a sensor (e.g., a pedal speed sensor or crank cadence sensor; the pedal speed sensor 304). The pedal speed sensor measures rotational speed of a crank arm, to which a pedal of the bicycle is attached, continuously or at a predetermined interval. The data representing the cadence speed may be a rotational speed value (e.g., in revolutions per minute).

Some wheel speed and crank cadence sensors that may be used for inputs to the method use a single magnet mounted on the wheel or crank, respectively, and a single reed switch or hall effect sensor mounted to the frame. As the wheel or crank rotates, the magnet passes by the Hall effect sensor or the reed switch once per revolution, generating a signal that is read by the processor. These sensor systems measure crank or wheel angular velocity using a time between activations of the reed switch or the Hall effect sensor.

In act 506, the processor compares the data representing the cadence speed (e.g., current cadence speed) received in act 504 to a target cadence speed. The target cadence speed may be user defined. For example, the bicycle may include one or more control devices (e.g., two control buttons) mounted on the handlebars of the bicycle. The two control buttons may be in communication (e.g., wireless communication and/or wired communication) with, for example, the e-bike controller 302 and/or other components on the bicycle. One of the two control buttons may generate a signal instructing an increase in the target cadence speed when pressed, and the other of the two control buttons may generate a signal instructing a decrease in the target cadence speed when pressed. A single press of either of the two control buttons, for example, increments or decrements the target cadence speed (e.g., a setpoint) by a configurable number of RPM. In one embodiment, the setpoint is adjustable within functionally practical predetermined bounds (e.g., 60 RPMs-120 RPMs). The rider attempting to adjust beyond the limits of the predetermined bounds has no effect on the setpoint. In other words, the setpoint will remain at the lower bound or the higher bound. The predetermined bounds may also be adjustable.

In one embodiment, shifter buttons that control the rear derailleur upshift and downshift actions may be dual purposed to control the setpoint of the automatic shifting target cadence. The upshift and downshift buttons may trigger the upshift and downshift actions of the rear derailleur, respectively, if the shifter button is pressed for less than a predetermined amount of time (e.g., less than 300 milliseconds). If a shifter button is pressed and held for longer than the predetermined amount of time (e.g., a long press), the long press may be considered a setpoint adjustment command and may increment or decrement the target cadence.

Each setpoint adjustment may only modify the target cadence by a small amount (e.g., 1 RPM) to achieve a precise adjustment. In one embodiment, in order to make a large adjustment to the target cadence quickly, a long press may be followed by one or more shorter presses (e.g., less than 300 milliseconds). As long as each shorter press occurs within some threshold time after the previous press (e.g., 800 milliseconds), the shorter presses may each cause an additional increment or decrement to the setpoint.

A memory in communication with the processor (e.g., a memory of the derailleur 102 or a memory of the e-bike controller 302) stores a gear ratio table and upshift/downshift tables. When the setpoint is adjusted by the rider, the processor recalculates the gear ratio table and the upshift/downshift tables based on the adjusted setpoint. If a closest gear ratio changes at the time of the setpoint adjustment, the derailleur immediately shifts, ignoring hysteresis built into the upshift/downshift tables.

In one embodiment, the setpoint adjustment is configured through a system control interface (e.g., an e-bike system control interface). The system control interface may be capable of displaying a current setpoint and directly adjusting the setpoint on the rear derailleur. In another embodiment, the setpoint adjustment is executed via a mobile device application in direct communication with the rear derailleur.

In act 508, the processor determines whether the current cadence speed received in act 504 is within a range (e.g., within 3 RPMs) relative to the target cadence speed based on the comparison of act 506. If the current cadence speed is within the range, the method returns to act 502. If the current cadence speed is outside of the range, the method moves to act 510.

In act 510, the processor compares the current wheel speed to a predetermined minimum wheel speed. For example, the processor calculates a difference between the current wheel speed and the predetermined minimum wheel speed. The predetermined minimum wheel speed represents, for example, a functional minimum rotational wheel speed.

In act 512, the processor determines whether the current wheel speed is greater than or less than the predetermined minimum wheel speed based on the comparison in act 510. If the processor determines the current wheel speed is less than the predetermined minimum wheel speed, a shift is not initiated, and the method returns to act 502. If the processor determines the current wheel speed is greater than the predetermined minimum wheel speed, the method moves to act 514.

The feature of overdriving chainring while not pedaling is limited by speed of bicycle. This provides that the chainring is not to be driven at a speed such that torque is applied to the wheel. Because of this, the method described above may not be applied when the bicycle is moving very slowly or is stopped. To overcome this, a hub capable of decoupling the cassette may be used. When the bicycle is stopped or moving below a speed at which the overdrive function may be safely used, the control system may decouple or declutch the cassette from the rear hub to allow forward motion of the cassette without applying torque to the wheel. With the hub decoupled, the derailleur may change gears, and the assist motor may run in overdrive to select a desirable gear for the slow or stopped condition. The crank speed sensor may be used to detect resumed rider input into the system. The control system recouples the cassette to the hub when rider pedaling or faster rider pedaling is detected.

In act 514, the processor determines whether the crank arm is rotating. For example, the processor determines whether the crank arm is rotating based on the current cadence speed received at act 504. If the current cadence speed is greater than zero, the method moves to act 516. If the current cadence speed is equal to zero or approximately zero (e.g., less than or equal to 1 RPMs), the method moves to act 518.

In act 516, the processor instructs a motor (e.g., a motor of the derailleur or the assist motor 140) to actuate and shift to maintain a gear that results in a rider cadence close to (e.g., within the range discussed above) the target cadence speed identified in act 506. After act 516, the method returns to act 502.

When performing automatic shifts, the derailleur may adjust a minimum timing between shifts based on current wheel speed, current cog, current rider cadence, or some other parameter to provide that each shift is completed before a next shift is attempted. This timing is optimized to allow shifting as fast as possible without inducing a shift failure.

The assist motor is to not run without the user pedaling such that the motor is accelerating or maintaining the bicycle speed. This is not difficult if the current wheel speed is accurate. The wheel speed sensor may, however, update the current wheel speed only once per revolution of the wheel. During rapid deceleration events, the bicycle may drop below a speed of the assist motor before the wheel speed sensor has reported the speed change. An accelerometer or inertial measurement unit (IMU) of the bicycle may be used to supplement the wheel speed sensor data by disabling the assist motor in the event of a significant deceleration. If a rapid deceleration event occurs, the assist motor may be temporarily stopped (e.g., if currently running) until wheel speed data has been updated.

In act 518, the processor instructs, for example, the assist motor to run for a period of time to allow the chain to derail to a target cog (e.g., with the motor of the derailleur). After act 516, the method returns to act 502.

When using the assist motor to facilitate shifting while the rider is not pedaling, the assist motor should be running the drivetrain slower than the bicycle is moving. A threshold for an amount of current consumed by the assist motor (e.g., proportional to the torque the assist motor is applying to the drivetrain) may be defined to prevent the motor from unwanted power input into the drivetrain. This is an intentionally redundant method of shutting down the assist motor to the speed calculation. It is important that the assist motor not apply unexpected torque to the drivetrain, causing unexpected acceleration of the bicycle.

A rate at which the assist motor, for example, drives the chain to facilitate shifting while the rider is not pedaling is to be low enough such that for a current gear ratio and the current wheel speed, no torque is transmitted to driving elements of a hub (e.g., chainring_rpm<current_gear_ratio*current_wheel_speed+ safety_margin). It is desirable to complete the shift as fast as possible. Accordingly, the chainring may be driven as fast as possible without applying torque to, for example, the rear wheel. The assist motor speed may therefore be set as a function of the current gear ratio and the current wheel speed. In an embodiment, the motor output torque is limited below a threshold during a motor aided shifting event. For example, the motor output torque may be limited to two ("2") newton-meters ("N m").

It is desirable that the assist motor run for as little time as is needed to complete the commanded shift. Any time the chainring is turning, the opportunity for a chainring derailment is increased (e.g., with the low pedaling loads of the motor assisted shift). The duration that the motor runs may be a function of the currently selected cog, as different cogs have different expected times to complete shift. In one embodiment the rear derailleur (e.g., the processor and/or one or more sensors of the rear derailleur) may determine when the shift has been completed (e.g., the chain has derailed to the target cog). In this case, the motor may run until the derailleur has detected the completion of the shift.

In one embodiment, the automatic shifting described above may operate with the motor drive function while not pedaling (e.g., overdriving the chainring while not pedaling) even if the bicycle is configured for zero rider assistance. In this configuration, the assist motor may only run when the derailleur is shifting and not pedaling to facilitate shifting. When the rider is pedaling, the non-assisting mode of the e-bike system is honored.

Figure 6:
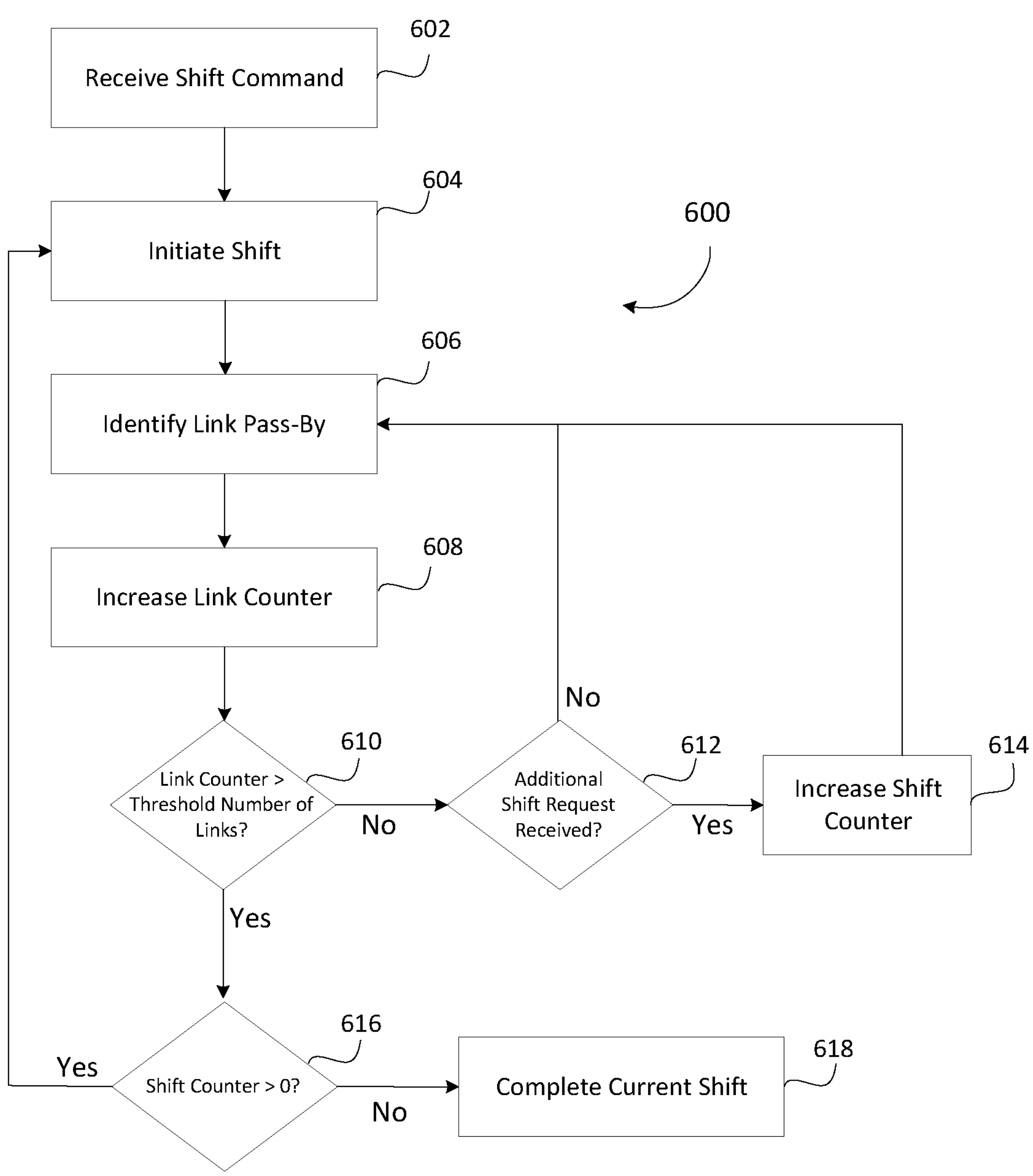
FIG. 6 is a flowchart of an embodiment of a method for controlling one or more components of a bicycle.

FIG. 6 is a flowchart of an embodiment of a method 600 for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

In act 602, a processor of the bicycle (e.g., a processor of the control system 300 a processor of the rear derailleur 138, and/or a processor of the e-bike controller 302) receives a shift command. The shift command may be received from an automatic shifting algorithm or from a user at a control device of the bicycle during a manual triggered shift. The shift command may include any number of different types of data including, for example, a direction of the shift and/or a number of shifts. The shift command may include different types of data.

In act 604, the processor initiates a shift (e.g., a first shift) of a derailleur (e.g., a rear derailleur) of the bicycle based on the shift command received in act 602. The processor (e.g., as part of the control system 300 or the e-bike controller) may enter a shifting state when the processor initiates the shift in act 604. In the shifting state, the processor may reject further shift requests.

In act 606, after the initiation of the shift of the derailleur in act 604, the processor identifies a link pass-by (e.g., a link pass-by event). For example, the processor identifies each time a link of the chain passes by a particular location of the bicycle. In one embodiment, the bicycle includes a chainring angle sensor, and the processor identifies the link pass-by based on data generated by and received from the chainring angle sensor. In another embodiment, the processor estimates when a link pass-by occurs based on a relative encoder position of a rotor of a motor of a power assist device (e.g., the power assist device), a DU gear ratio, and a size of a chainring of the drivetrain. Other sensors and/or methods may be used to identify the link pass-by.

For example, a link counter (e.g., a sensor module separate from the processor) detects chain movements and counts links by measuring a relative chainring angle. With a chainring size (e.g., a number of teeth) and a relative chainring angle being known, a number of links that passed the chainring may be calculated. For example, a number of links passed is equal to a relative chainring angle degree multiplied by the chainring size and divided by 360 degrees. The number of links passing the chainring is equal to a number of links passing a cassette.

While a rider pedals without motor-assist from the bicycle (e.g., an electric bicycle), the relative chainring angle is equal to a relative pedal angle derived from a cadence sensor, for example. While an assist motor of the bicycle (e.g., the electric bicycle) is active (e.g., shifting while coasting or while motor assist is provided as the rider pedals), the relative chainring angle may be determined from a relative motor encoder position divided by a drive-unit gearbox ratio.

In act 608, the processor increments (e.g., increases by one) the link counter. The link counter is stored in a memory in communication with the processor. The memory may be included within any number of components of the bicycle (e.g., the control system 300, the rear derailleur 138, and/or the e-bike controller 302). Acts 606 and 608 may be repeated any number of times in that the processor may increment the link counter each time the processor identifies a link pass-by event.

In act 610, the processor compares a current value (e.g., number) of the link counter to at least one predetermined threshold number of links. For example, the at least one predetermined threshold number of links may include a predetermined threshold number of links that corresponds to a worst-case number of links passing by until the chain is engaged in a target cog of the cassette, and the processor is ready for another shift request. The predetermined threshold number of links may be stored in the memory or another memory at manufacture of the bicycle and/or may be user-defined.

In one embodiment, the at least one predetermined threshold number of links includes at least three predetermined threshold number of links (e.g., a first threshold number of links, a second threshold number of links, and a third threshold number of links). The numbers of link pass-by events, after which the rear derailleur is ready for another shift, may differ depending on directions of the first shift and the second shift, respectively.

The comparison in act 610 may be between the current value of the link counter and the first threshold number of links when the first shift and the second shift are in a same direction. The comparison in act 610 may be between the current value of the link counter and the second threshold number of links when the first shift and the second shift are in different (e.g., opposite) directions. The second threshold number of links may be greater than the first threshold number of links. In other words, the method 600 may wait longer before allowing shifts in the opposite direction compared to shifts in the same direction.

In one embodiment, in addition to comparing the current value of the link counter to the first threshold number of links or the second threshold number of links, the processor also compares the current value of the link counter to the third threshold number of links. The third threshold number of links may, for example, be zero links. When the current value of the link counter is zero, the bicycle may be identified as stationary.

If the processor determines, in act 610, the current value of the link counter is less than (e.g., or equal to) the first predetermined threshold number of links or the second predetermined threshold number of links, the method 600 moves to act 612. If the processor determines, in act 610, the current value of the link counter is greater than the first predetermined threshold number of links or the second predetermined threshold number or links, the method 600 moves to act 616.

In act 612, the processor identifies whether an additional shift request (e.g., an automatic shifting request or a manual shifting request for a second shift) has been received by the processor since the shift was initiated in act 604. For example, the processor identifies whether an additional shift command has been received. If the processor determines, in act 612, an additional shift request has not been received, the method 600 returns to act 606 for identification of another link pass-by of the chain of the bicycle. If the processor determines, in act 612, an additional shift request has been received, the method 600 moves to act 614.

If the processor determines the additional shift request has been received, the processor may identify any number of different types of data from the additional shift request including, for example, a direction of the shift and/or a number of shifts. The additional shift command may include different types of data.

In act 614, the processor increments (e.g., increases by one) a shift counter. The shift counter is stored in the memory or another memory. The other memory may be included within any number of components of the bicycle (e.g., the control system 300, the rear derailleur 138, and/or the e-bike controller 302). For example, the shift counter may represent not only a number of shifts requested while the processor has been in the shifting state but directions of the number of shifts, respectively. The shift counter may be stored in a buffer, and the processor acts on the shift(s) represented by the shift counter as soon as the processor is out of the shifting state. After act 614, the method 600 returns to act 606 for identification of another link pass-by of the chain of the bicycle.

In one embodiment, instead of incrementing the shift counter in act 614, the processor may identify whether the additional shift request is for a compensation shift with no chain movement. Such a compensation shift with no chain movement may correspond to when a rider is coasting and an assist motor of the electric bicycle, for example, is not active, or when the rider shifts back and forth while standing still.

The processor may, for example, compare the current value of the link counter to the third predetermined threshold number of links, and may identify, based on the comparison, that the additional shift request is for a compensation shift when the current value of the link counter is equal to the third predetermined threshold number of links (e.g., the chain is not moving). In one embodiment, the processor only identifies the additional shift request as being for a compensation shift when the processor also identifies that the second shift is in an opposite direction compared to the first shift.

When the processor identifies the additional shift request is for a compensation shift, the processor may initiate an additional shift (e.g., the compensation shift) based on the additional shift request. The processor may initiate the additional shift instead of incrementing the shift counter. In such an embodiment, after the processor initiates the additional shift, the method 600 may return to act 606.

Acts 612 and 614 may be performed by the processor only in a manual triggered mode, and is not performed in the automatic mode. Alternatively, acts 612 and 614 may be performed in both the automatic mode and manual triggered mode.

In act 616, the processor determines whether the shift counter is greater than 0. In other words, the processor determines whether any additional shift requests have been received while the processor has been in the shifting state and has rejected additional shift requests. If the processor determines, in act 616, that the shift counter is greater than 0, the method 600 returns to act 604, and an oldest shift request represented by the shift counter (e.g., as identified in the buffer) is initiated in repeated back 604. At least acts 604-616 may be repeated until all shift requests represented by the shift counter are executed.

In act 618, the processor completes the shift initiated in act 604. The processor may enter a ready state, in which the processor is ready for a next shift and is configured to process further shift requests.

In one embodiment, when at least acts 604-616 are repeated for an additional shift request received in act 612, and the additional shift request is in an opposite direction (e.g., outboard) of a previous (e.g., most recent) shift request (e.g., for an inboard shift), the processor may not act on the additional shift request until the processor enters a shift complete state. For example, the threshold number of links used in act 610 may be increased when a next shift request (e.g., the additional shift request, as identified by the shift counter) is in an opposite direction of a current shift request. This provides that the chain is sufficiently wrapped around the cassette in order to minimize risk of damage.

In one embodiment, when the processor transitions to the ready state (e.g., the processor will allow another shift in a same direction as the previous shift), the chain may be engaged with, for example, sixteen, eighteen, twenty, or another number of teeth of the cog the chain is shifting onto. When the processor transitions to the shift complete state (e.g., the chain is all the way around the cog), the chain may be engaged with, for example, 20-33 teeth of the cog the chain is shifting onto, depending on any number of different factors. For example, the processor may access a lookup table in the memory and determine the number of links until shift complete state based on any number of inputs including, for example, output power, speed, cadence, acceleration, and/or one or more other parameters.

For example, when the additional shift request is for a shift in a same direction of the current shift request, the threshold number of links (e.g., the first predetermined threshold number of links) may be, for example, twenty links; when the additional shift request is for a shift in an opposite direction of the current shift request, the threshold number of links (e.g., the second predetermined threshold number of links) may be, for example, 30 links. Other numbers of links may be provided for the threshold number of links for same direction shifts and opposite direction shifts, respectively.

The method 600 is a synchronization method that provides that shift requests are only processed when a drivetrain of the bicycle is ready for a shift. The method 600 may help avoid chain breaking or cassette damage by, for example, preventing the chain from getting crossed over two or more cogs of the cassette while shifting. The method 600 also enables a fastest multiple shift on an external drivetrain system, dependent on rider cadence.

Figure 7:
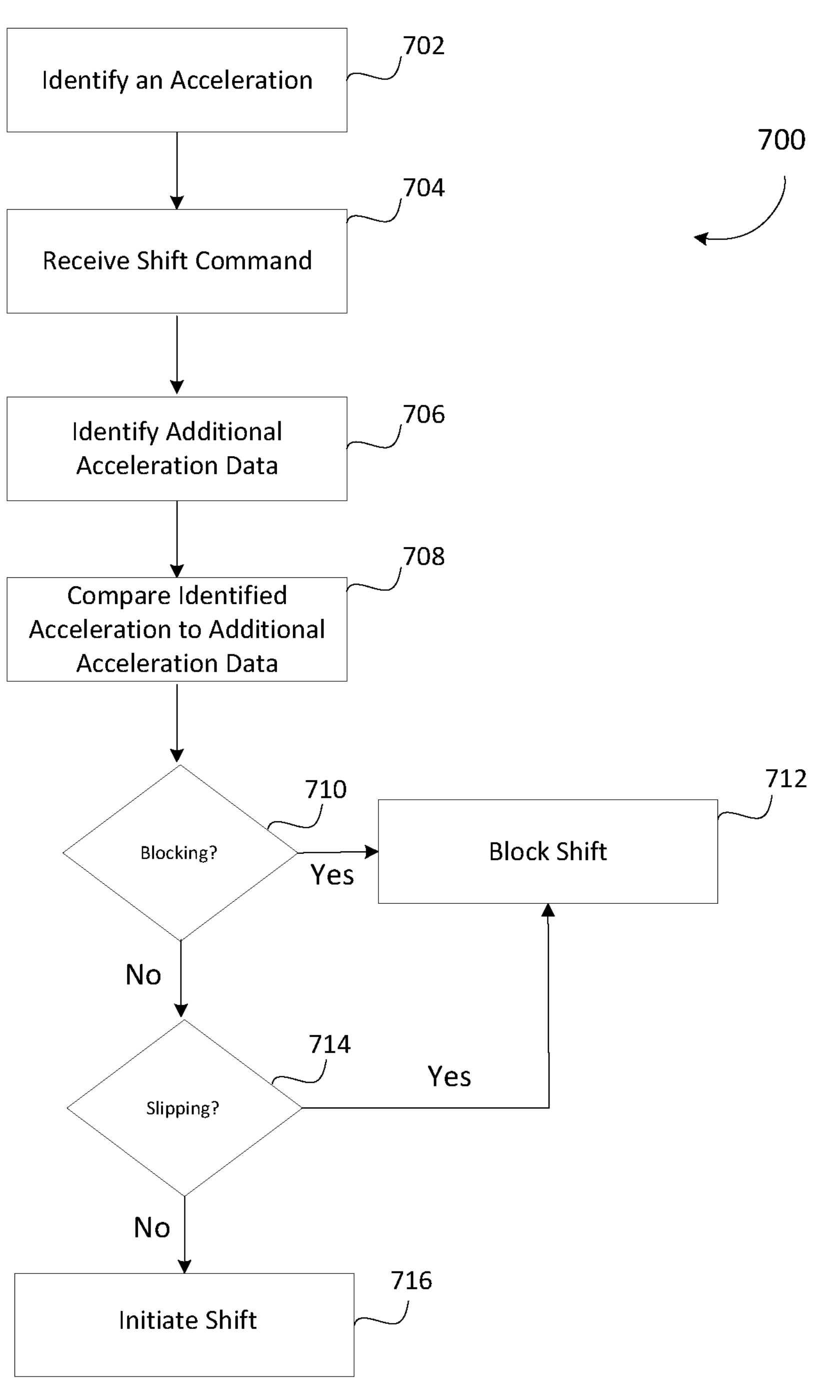
FIG. 7 is a flowchart of another embodiment of a method for controlling one or more components of a bicycle.

FIG. 7 is a flowchart of an embodiment of a method 700 for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

An automatic shifting algorithm may trigger shifting based on a speed of the bicycle measured by a wheel speed sensor. Within a slipping or blocking condition, the speed of the bicycle measured by the wheel speed sensor does not reflect a real translative speed of the bicycle. Within the slipping condition, the speed of the bicycle measured by the wheel speed sensor is higher than the real translative speed of the bicycle, leading to an unintended outboard shift, for example. Through this increasing wheel speed, more outboard shifts may be triggered, causing more slips. The slipping condition combined with assist motor support may make a rider lose control and may lead to a safety critical situation. Within the blocking condition, the speed of the bicycle measured by the wheel speed sensor is less than the real translative speed of the bicycle, leading to an unintended inboard shift.

The method 700 allows for the real translative speed of the bicycle to be calculated, even when the bicycle is in the slipping condition or the blocking condition. The method 700 also allows for an end of the slipping condition or the blocking condition to be determined. An automatic shifting algorithm may thus determine a best gear for the riding condition, even when the bicycle is in the slipping condition or the blocking condition.

In act 702, a processor identifies an acceleration (e.g., a first acceleration) of the bicycle. For example, the bicycle may include one or more wheel speed sensors (e.g., at a rear wheel of the bicycle) and/or one or more cadence sensors (e.g., at a crank assembly of the bicycle), and the processor may receive sensor data from and generated by the one or more wheel speed sensors and/or the one or more cadence sensors. The processor may determine the acceleration of, for example, the rear wheel of the bicycle or a crank arm of the crank assembly based on the received sensor data. For example, the processor may determine the acceleration of the rear wheel or the crank arm of bicycle by taking a derivative of a subset of the received sensor data. The processor may calculate, for example, a translative acceleration of the bicycle as the acceleration of the bicycle based on, for example, the determined acceleration of the rear wheel or the crank arm of the bicycle. The processor may identify the acceleration of the bicycle in other ways, and/or the processor may determine the acceleration of the bicycle based on data from other types of sensors (e.g., one or more accelerometers).

In act 704, the processor receives a shift command. The received shift command is, for example, an automatic shifting command. The shift command received in act 704 may be, for example, generated by an automatic shifting algorithm in response to acceleration identified in act 702.

In act 706, the processor identifies additional acceleration data for the bicycle. In one embodiment, the additional acceleration data includes one or more predetermined threshold accelerations (e.g., a predetermined threshold acceleration). The predetermined threshold acceleration represents, for example, a maximum achievable deceleration of the bicycle when the bicycle is braking under ideal condition, or a maximum achievable acceleration of the bicycle when the bicycle is operating in ideal conditions. The predetermined threshold acceleration(s) may be determined in a laboratory and saved in a memory of the bicycle that is in communication with the processor. The predetermined threshold acceleration(s) may be saved in the memory at manufacture of the bicycle and/or may be rider defined. Other predetermined threshold acceleration(s) may be used.

In one embodiment, the additional acceleration data includes both a first predetermined threshold acceleration representing the maximum achievable deceleration, and a second predetermined threshold acceleration representing the maximum achievable acceleration. A deceleration identified in act 702 that is greater than the first predetermined threshold acceleration, for example, is more negative than the first predetermined threshold acceleration (e.g., greater deceleration). In one embodiment, the first predetermined threshold acceleration is $-6.0\ m/s^2$, and the second predetermined threshold acceleration is $2\ m/s^2$. Other values may be provided for the first predetermined threshold acceleration and the second predetermined threshold acceleration, respectively.

In another embodiment, the additional acceleration data includes acceleration data from one or more other sensors of the bicycle (e.g., one or more accelerometers) and/or an acceleration (e.g., a second acceleration) calculated based on the acceleration data from the one or more other sensors of the bicycle. For example, the accelerometers of the bicycle may generate three-axes acceleration data. The processor may calculate an acceleration vector in a bicycle-forward direction (e.g., the second acceleration) based on the three-axes acceleration data.

In act 708, the processor compares the acceleration identified in act 702 (e.g., the first acceleration) to the additional acceleration data identified in act 702 or the acceleration (e.g., the second acceleration) calculated based on the additional acceleration data. For example, the processor compares the acceleration identified in act 702 to the first predetermined threshold acceleration representing the maximum achievable deceleration, and the second predetermined threshold acceleration representing the maximum achievable acceleration. The comparison may include the processor determining whether the acceleration identified in act 702 is less than the first predetermined threshold acceleration or the acceleration identified in act 702 is greater than the second predetermined threshold acceleration.

In one embodiment, the processor compares the first acceleration identified in act 702 (e.g., calculated based on data from the one or more wheel speed sensors and/or the one or more cadence sensors) to the second acceleration identified in act 706 (e.g., from the one or more accelerometers). For example, the processor may calculate an absolute value of a ratio of the first acceleration to the second acceleration.

In act 710, the processor determines whether the bicycle is in a blocking condition (e.g., full braking, based on abnormal acceleration values). In one embodiment, the processor determines the bicycle is in the blocking condition when, based on the comparison in act 708, the first acceleration identified in act 702 is less than the first predetermined threshold acceleration.

In another embodiment, the processor determines the bicycle is in the blocking condition when, based on the comparison in act 708, the absolute value of the ratio of the first acceleration to the second acceleration is less than one minus a predetermined tolerance. For example, when the bicycle is not in the blocking condition (or the slipping condition), the first acceleration and the second acceleration are equal, within the predetermined tolerance. The processor identifies the bicycle is in the blocking condition when the following is true:

$$\left|\frac{a_{wheelspeed}}{a_{accel}}\right| < 1 - x \quad \text{with } a_{wheelspeed} < 0$$

where $a_{wheelspeed}$ is the first acceleration, $a_{accel}$ is the second acceleration, and x represents the tolerance.

If the processor determines, in act 710, that the bicycle is in the blocking condition, the method 700 moves to act 712. Otherwise, the method 700 moves to act 714.

In act 714, the processor determines whether the bicycle is in a slipping condition (e.g., from slippery conditions, based on abnormal acceleration values). In one embodiment, the processor determines the bicycle is in the slipping condition when, based on the comparison in act 708, the first acceleration identified in act 702 is greater than the second predetermined threshold acceleration.

In another embodiment, the processor determines the bicycle is in the slipping condition when, based on the comparison in act 708, the absolute value of the ratio of the first acceleration to the second acceleration is greater than one plus the predetermined tolerance. For example, when the bicycle is not in the slipping condition (or the blocking condition), the first acceleration and the second acceleration are equal, within the predetermined tolerance. The processor identifies the bicycle is in the slipping condition when the following is true:

$$\left|\frac{a_{wheelspeed}}{a_{accel}}\right| > 1 - x \quad \text{with } a_{wheelspeed} > 0$$

where $a_{wheelspeed}$ is the first acceleration, $a_{accel}$ is the second acceleration, and x represents the tolerance.

In yet another embodiment, the processor may receive acceleration data measured by a global positioning system (GPS) sensor of the bicycle or carried by the user. The GPS measured acceleration may directly indicate a translative acceleration of the bicycle, and an automatic shifting algorithm may be controlled based on the GPS measured acceleration. For example, if no translative acceleration of the bicycle is detected by the GPS sensor (e.g., even if a high wheel speed acceleration is detected), an outboard shift may not be triggered.

In another embodiment, the processor may determine whether the bicycle is in the slipping condition by comparing a bicycle speed derived from the GPS sensor with a bicycle speed derived from a wheel speed sensor. When the GPS sensor and the wheel speed sensor return same values within a predetermined tolerance, the processor may identify the bicycle is not slipping. When the processor determines an absolute value of a difference of the values returned by the GPS sensor and the wheel speed sensor, respectively, exceeds the predetermined tolerance, the processor may identify the bicycle as being within the slipping condition or the blocking condition. For example, when the bicycle speed derived from the wheel speed sensor is greater than the bicycle speed derived from the GPS sensor, the processor may identify the bicycle as being within the slipping condition. When the bicycle speed derived from the wheel speed sensor is less than the bicycle speed derived from the GPS sensor, the processor may identify the bicycle as being within the blocking condition.

If the processor determines, in act 714, that the bicycle is in the slipping condition, the method 700 moves to act 712. Otherwise, the method 700 moves to act 716.

In act 712, the processor blocks a shift corresponding to the shift command received in act 704 due to the blocking condition of the bicycle being identified in act 710 or the slipping condition of the bicycle being identified in act 714. In one embodiment, the processor blocks the shift (e.g., and any other shifts) for a predetermined amount of time. For example, the processor blocks shifting for two seconds, three seconds, four seconds, or another predetermined amount of time.

In another embodiment, the processor blocks shifting until an end of the blocking condition of the bicycle or the slipping condition of the bicycle is identified. For example, after the blocking condition of the bicycle is identified in act 710 or the slipping condition of the bicycle is identified in act 714, the determination of the first acceleration, the determination of the second acceleration, and the determination of the absolute value of the ratio of the first acceleration to the second acceleration are repeated (e.g., at a predetermined time interval) until the following is satisfied:

$$1 - x < \left|\frac{a_{wheelspeed}}{a_{accel}}\right| < 1 + x$$

where $a_{wheelspeed}$ is the first acceleration, $a_{accel}$ is the second acceleration, and x represents the tolerance.

In one embodiment, after the blocking condition of the bicycle is identified in act 710 or the slipping condition is identified in act 714, the processor may determine a speed of the bicycle based on the second acceleration, for example, and may use the determined speed of the bicycle within an automatic shifting algorithm. For example, the processor may calculate the speed of the bicycle using the following:

$$v_{trans}(t) = v_{t0} + \int_{to}^{t} a(t)dt,$$

where $t_0$ = time at start of slipping or blocking condition;

$v_{t0} = v_{wheelspeed}$ measured at start of slipping or blocking condition;

$a(t)$ = translative acceleration derived from accelerometers; and $v_{trans}(t)$ = real translative bicycle speed.

In act 716, the processor initiates a shift corresponding to the shift command received in act 704. In act 716, the processor has not identified blocking or slipping in acts 710 and 714, and the processor initiates the shift corresponding to the shift command received in act 704.

Using three-axis acceleration sensor data in combination with wheel speed data increases reliability of slipping and/or blocking detection, and allows for the calculation of a real translative bicycle speed even when the bicycle is slipping or blocking. With this information, the processor may, using an automatic shifting algorithm, identify a best gear for operation of the bicycle.

In one embodiment, additional filtering is applied to the sensor data (e.g., input signals) received in act 702. In another embodiment, the automatic shifting algorithm may adapt and/or learn based on other inputs such as, for example, rider power and motor power, system weight, gradient, and/or other inputs. In yet another embodiment, the bicycle may include one or more sensors configured to detect brake actuation, and the processor may block shifting from the automatic shifting algorithm for a predetermined period of time after the detection of the brake actuation.

In automatic shifting, the automatic shifting algorithm may trigger an outboard shift, for example, when a speed of a wheel of the bicycle (e.g., a wheel speed) or a cadence (e.g., of a crank arm of the bicycle) reaches a predetermined limit value. A rider accelerating over a slippery ground, for example, reaches the predetermined limit value, and the automatic shifting algorithm may initiate an outboard shift. This, on a slippery ground, for example, leads to more slip and may trigger additional outboard shifts until the rider loses control of the bicycle. In automatic shifting, an inboard shift is triggered when the wheel speed of the bicycle decreases. When the wheel is being blocked (e.g., with full brake applied by the rider) for a period of time, the cassette cannot rotate, but the automatic shifting algorithm may initiate an inboard shift. The method 700 detects slipping or blocking based on abnormal acceleration values detected by one or more sensors of the bicycle, and blocks shifting (e.g., by the automatic shifting algorithm) based on the detected slipping or blocking.

Figure 8:
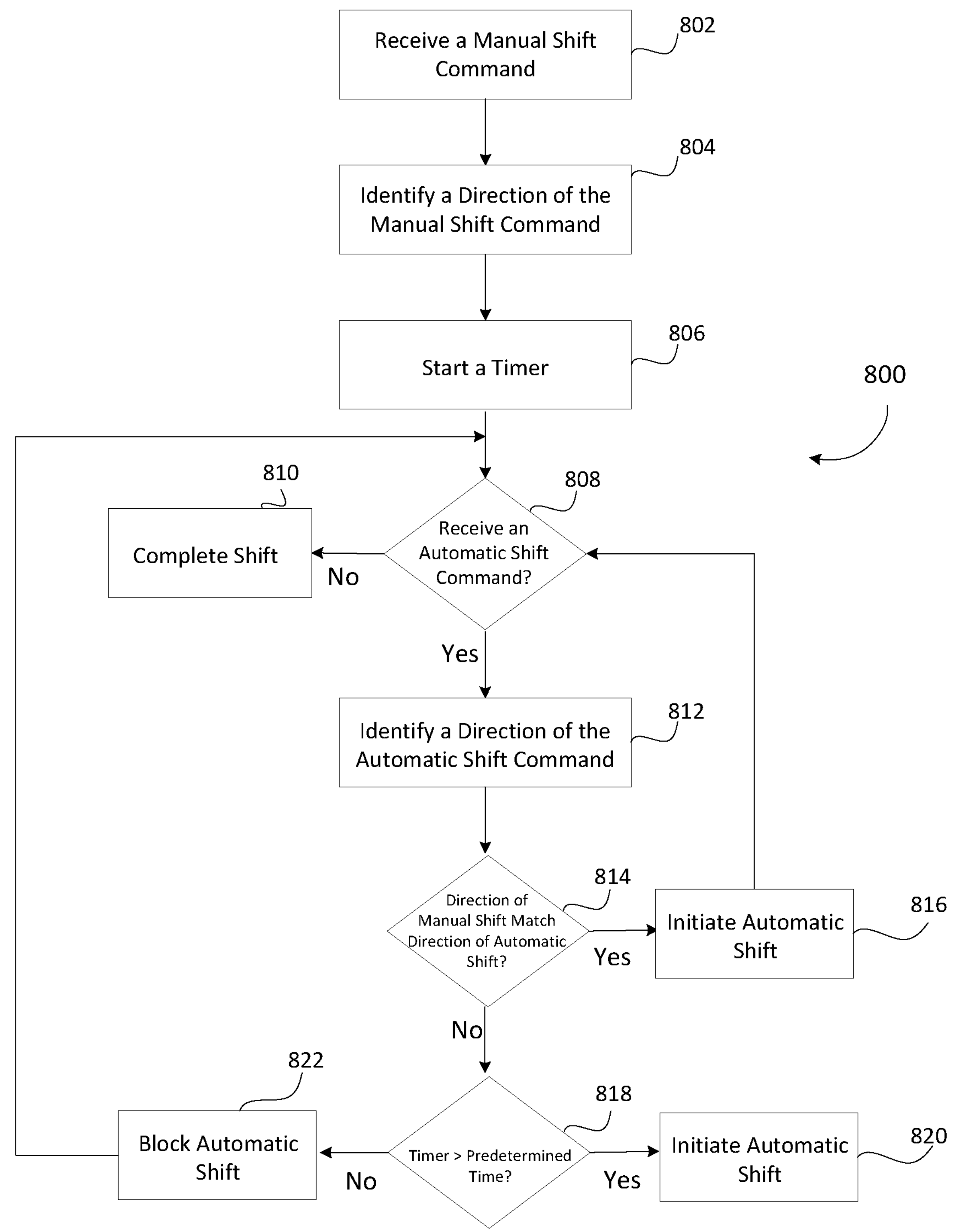
FIG. 8 is a flowchart of another embodiment of a method for controlling one or more components of a bicycle.

FIG. 8 is a flowchart of an embodiment of a method 800 for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

In act 802, a processor receives a manual shift command. The manual shift command may be generated in response to, for example, rider interaction with a control device at the bicycle. In act 804, the processor identifies a direction of a shift corresponding to the manual shift command received in act 802. The shift corresponding to the manual shift command received in act 802 may be, for example, an inboard shift or an outboard shift. The processor may identify the direction of the shift corresponding to the manual shift command received in act 802 based on a signal generated in response to the rider interaction with the control device of the bicycle. For example, different signals may be generated based on different rider inputs at one or more control devices of the bicycle, and the processor may identify the direction of the shift based on the signal generated and received by the processor.

In act 806, the processor starts a timer. The processor may start the timer after the processor initiates the shift corresponding to the manual shift command received in act 802.

In act 808, after the timer has started in act 806, the processor determines whether an automatic shift command (e.g., from an automatic shifting algorithm) has been received. If the processor determines, in act 808, that an automatic shift command has not been received, the method 800 moves to act 810. If the processor determines, in act 808, that an automatic shift command has been received, the method 800 moves to act 812.

In act 810, a shift corresponding to the manual shift is completed, and the method 800 ends. In one embodiment, the method 800 ends after the timer started in act 806 reaches a predetermined time (e.g., an override time).

In act 812, the processor determines a direction of a shift corresponding to the automatic shift command identified in act 808. For example, the direction of the shift corresponding to the automatic shift command identified in act 808 may be inboard or outboard. The automatic shift command identified in act 808 may include a direction of the shift and a number of cogs to transverse.

In act 814, the processor determines whether the direction of the shift corresponding to the manual shift command identified in act 804 matches the direction of the shift corresponding to the automatic shift command identified in act 812.

If the processor determines, based on the comparison in act 814, the directions match, the method 800 moves to act 816. For example, if the direction of the shift identified in act 804 is inboard and the direction of the shift identified in act 812 is inboard, the method 800 moves to act 816. As another example, if the direction of the shift identified in act 804 is outboard and the direction of the shift identified in act 812 is outboard, the method 800 moves to act 816.

If the processor determines, based on the comparison in act 814, the directions do not match, the method 800 moves to act 818. For example, if the direction of the shift identified in act 804 is inboard and the direction of the shift identified in act 812 is outboard, the method 800 moves to act 818. As another example, if the direction of the shift identified in act 804 is outboard and the direction of the shift identified in act 812 is inboard, the method 800 moves to act 818.

In act 816, the processor initiates the shift corresponding to the automatic shift command identified in act 808. After act 816, the method 800 returns to act 808, at which an additional automatic shift command may be identified.

In act 818, the processor determines whether an elapsed time of the timer is greater than a predetermined threshold time (e.g., an override time). If the processor determines, in act 818, that the elapsed time of the timer is greater than the predetermined threshold time, the method 800 moves to act 820. If the processor determines, in act 818, that the elapsed time of the timer is not greater than (e.g., is less than or equal to) the predetermined threshold time, the method 800 moves to act 822.

In act 820, the processor initiates the shift corresponding to the automatic shift command identified in act 808. In act 820, the override time has elapsed, so automatic shifting in a direction opposite the shift corresponding to the manual shift command received in act 802 is no longer blocked.

In act 822, the processor blocks the shift corresponding to the automatic shift command identified in act 808. In act 822, the override time has not yet elapsed, so automatic shifting in a direction opposite the shift corresponding to the manual shift command received in act 802 is blocked.

In one embodiment, the processor may pause the timer (e.g., remove the blocking) when the processor identifies a stall. For example, the processor may determine a cadence of a crank arm of the bicycle, and compare the determined cadence of the crank arm to a cadence setpoint (e.g., as part of an automatic shifting algorithm). The comparing of the determined cadence of the crank arm to the cadence setpoint may include, for example, determining a difference between the determined cadence of the crank arm and the cadence setpoint. The processor may compare the determined difference to a predetermined threshold difference, and may identify a stall of the bicycle (e.g., of an assist motor of the bicycle) when, based on the comparison of the determined difference to the predetermined threshold difference, the determined difference is greater than the predetermined threshold difference. The processor may pause the timer or remove the blocking, such that the shift of the bicycle in the second direction when the second shift direction and the first shift direction are different is allowed.

After act 822, the method 800 returns to act 808, at which the processor waits for another automatic shift command. The method 800 may time out once the timer started in act 806 matches, for example, the override time. The override time may be a fixed amount of time (e.g., 7 seconds) or may be variable depending on, for example, a ride situation, terrain, or rider input.

On a bicycle with automatic shifting, the rider may at any time execute one or more manual shifts that have priority over shift decisions of an automatic shifting algorithm. Current solutions may use a manual override time to prevent the automatic shifting algorithm from undoing the one or more rider executed manual shifts.

In the present embodiments, when the rider executes a manual override, the processor blocks shift requests by the automatic shifting algorithm to an opposite direction of a shift direction of the manual override. The processor does, however, execute shift requests by the automatic shifting algorithm to a same direction as the shift direction of the manual override. For example, when the rider executes a manual inboard shift before going into a climb, the processor may assist the rider with additional automatic inboard shifts when the bicycle decelerates, without waiting for an override time to pass. Outboard shifts due to, for example, high speed may, however, be blocked during the override time.

Figure 9:
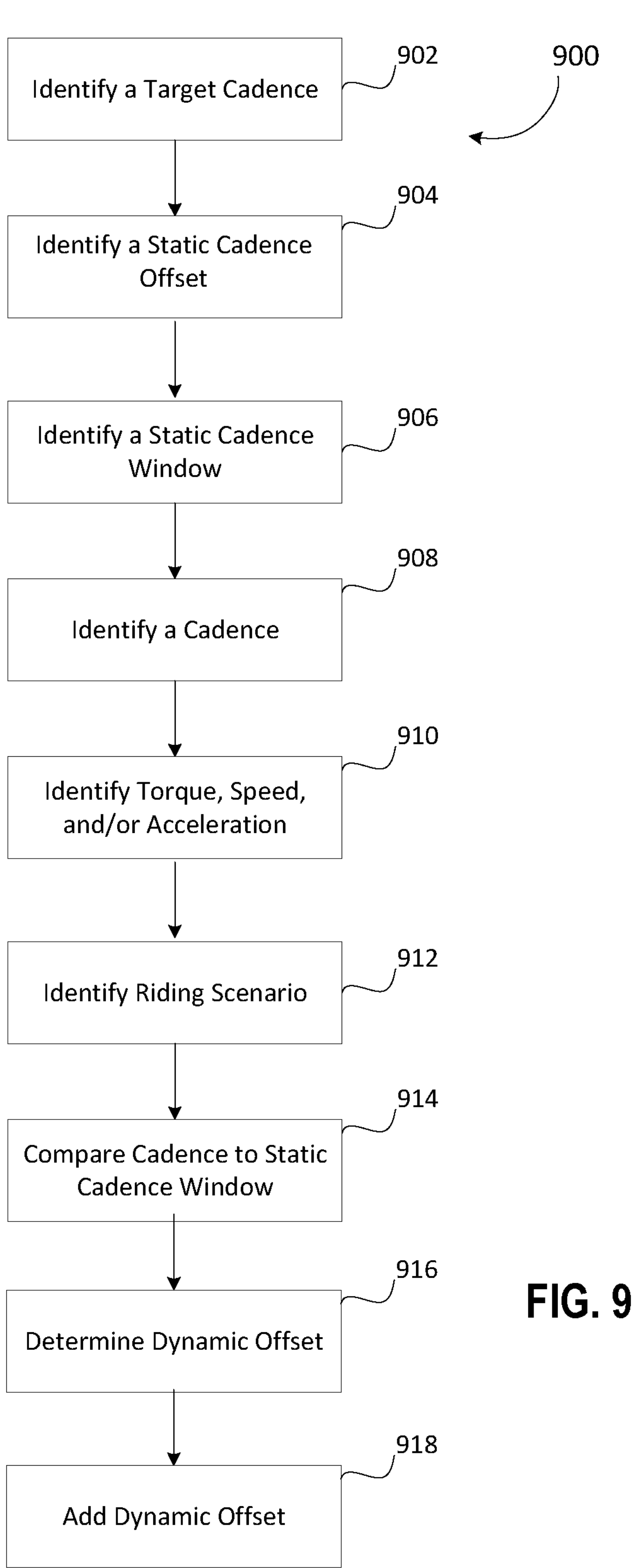
FIG. 9 is a flowchart of another embodiment of a method for controlling one or more components of a bicycle.

FIG. 9 is a flowchart of an embodiment of a method 900 for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

An automatic shifting algorithm may define a static target cadence window, and a processor, using the automatic shifting algorithm, may keep cadence at the bicycle within the static target cadence window by changing gears when actual cadence exceeds a threshold of the target cadence window.

The static cadence window depends on a cadence setpoint that defines a middle of the static cadence window, a cassette geometry, and an overlap offset (e.g., hysteresis) that defines a size of the of the static cadence window for each gear.

With particular rider output and specific terrain, such an automatic shifting algorithm may not be ideal, as a rider may be in a wrong gear that feels like being stalled or spinning out. Ride statistics and data logs have shown that riders prefer a different cadence in different riding scenarios. For example, for active and/or athletic riding with a higher torque, a higher target cadence may be desired by the rider. As another example, for relaxed commuting with a lower torque, a lower target cadence may be desired by the rider. As yet another example, riding on a technically simple terrain (e.g., a flat road) may require a more reactive behavior to keep the rider close to the target cadence, as no drops or peaks in the cadence are expected. As another example, riding on a technically complex terrain (e.g., identified based on steep uphill, high torque, a larger number of positive and negative wheel speed accelerations, vibration) allows a more resilient shift behavior to allow drops and peaks in speed and/or cadence without shifting when passing obstacles.

In act 902, a processor identifies a target cadence. The target cadence may be predetermined, set by a rider, or determined in another way. For example, the target cadence identified in act 902 may be static or may vary based on, for example, rider torque and/or power input at the crank arm of the bicycle. For example, the processor may identify an initial target cadence setpoint within a memory in communication with the processor, and the processor may dynamically adjust the initial target cadence setpoint (e.g., a first target cadence setpoint) based on rider input and/or torque (see acts 908 and 910). The processor may determine the rider input based on torque at a crank arm of the bicycle, cadence at the crank arm of the bicycle, speed of the bicycle, acceleration of the bicycle, or any combination thereof. For example, the processor may determine the rider input by multiplying the torque at the crank arm of the bicycle by the cadence at the crank arm of the bicycle.

The processor may identify a predetermined threshold torque and/or a predetermined threshold input power. The predetermined threshold torque and the predetermined threshold input power may be thresholds that separate active riding (e.g., with higher output torque and/or input power) and relaxed riding (e.g., with lower output torque and/or input power). The processor may compare the torque at the crank arm of the bicycle to the predetermined threshold torque, and/or may compare the rider input to the predetermined threshold input power. When, based on the comparison, the torque at the crank arm, for example, moves above the predetermined threshold torque (e.g., from below the predetermined threshold torque), the processor may dynamically adjust the initial target cadence setpoint upwards (e.g., to a second target cadence setpoint). When, based on the comparison, the torque at the crank arm, for example, moves below the predetermined threshold torque (e.g., from above the predetermined threshold torque), the processor may dynamically adjust the target cadence setpoint downwards (e.g., from the second target cadence setpoint to the first target cadence setpoint). Higher rider torque may result in a higher target cadence, and lower rider torque may result in lower target cadence.

Figure 10:
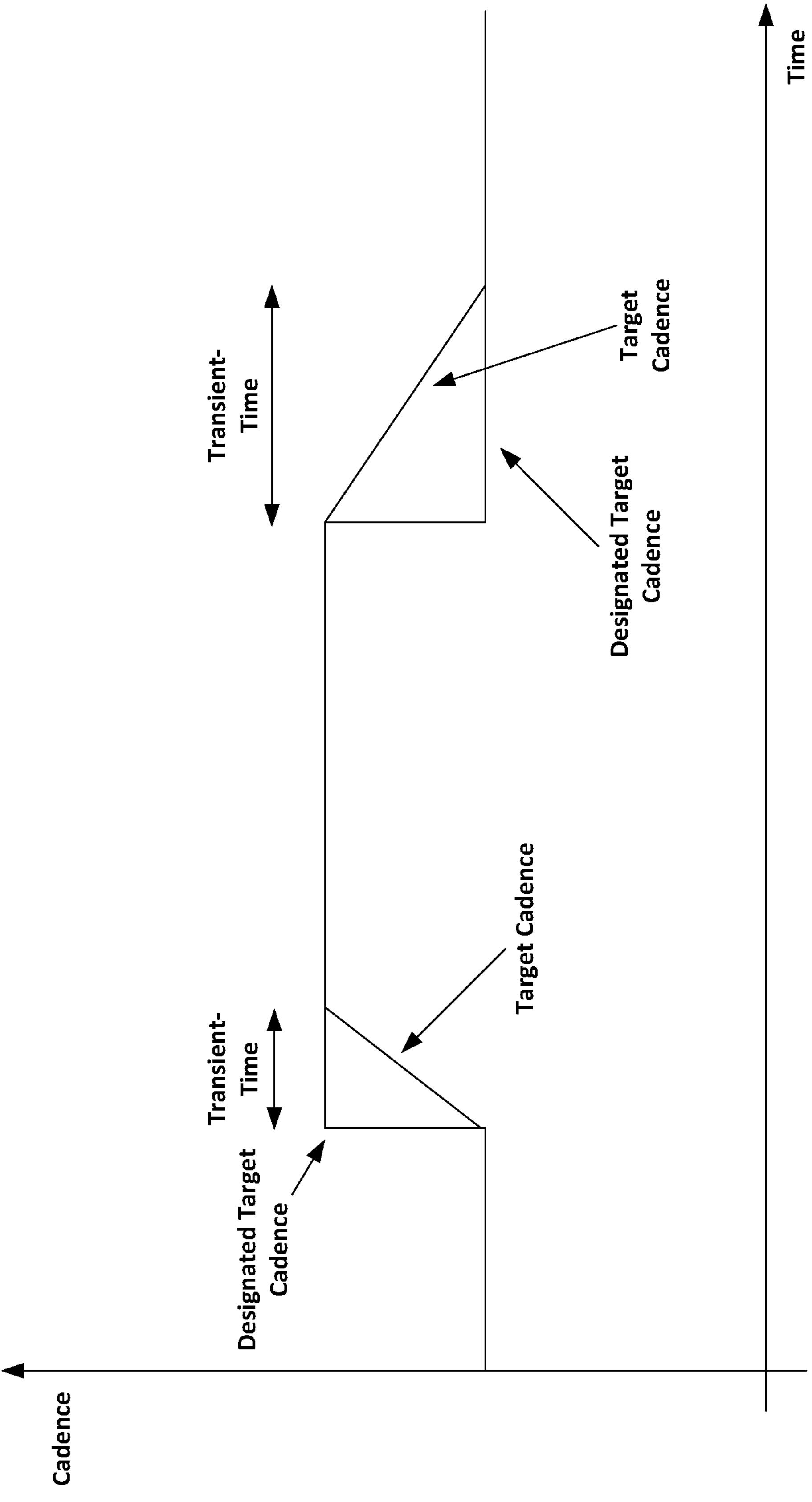
FIG. 10 illustrates an example of dynamic target cadence adjustment.

FIG. 10 shows an example of dynamic target cadence adjustment. When, based on the comparison discussed above, the torque at the crank arm moves above the predetermined threshold torque, for example, the processor may dynamically adjust the target cadence from the first target cadence setpoint to the second target cadence setpoint (e.g., the “designated target cadence”), as shown in FIG. 10. In the embodiment shown in FIG. 10, the processor may gradually increase the target cadence from the first target cadence setpoint to the second target cadence setpoint (e.g., over a transient time). When, based on the comparison discussed above, the torque at the crank arm moves below the predetermined threshold torque, for example, the processor may dynamically adjust the target cadence from the second target cadence setpoint to the first target cadence setpoint, as shown in FIG. 10. In the embodiment shown in FIG. 10, the processor may gradually decrease the target cadence from the second target cadence setpoint to the first target cadence setpoint (e.g., over a transient time). In one embodiment, the processor low pass filters adjustments of the target cadence to avoid jumps in a signal representing the target cadence.

In act 904, the processor identifies a static cadence offset. The static cadence offset defines a static offset around the target cadence identified in act 902, for example. In one embodiment, the processor identifies the static cadence offset based on a gear in which the bicycle is operated. In other words, the static cadence offset may be gear specific. For example, the static cadence offset is defined by cassette geometry, which defines a speed range. A ratio of a gear may be a most ideal (e.g., closest to target cadence) of available gears. The memory may store a lookup table with static cadence offsets and corresponding cassette geometries, and the processor may identify the static cadence offset using the stored lookup table. A low gear may, for example, have a larger static cadence offset than a high gear.

In act 906, the processor determines a static cadence window based on the target cadence identified in act 902 and the static cadence offset identified in act 904. The static cadence window has an upper limit and a lower limit. For example, the processor may determine the upper limit of the static cadence window by adding the static cadence offset identified in act 904 to the target cadence identified in act 902, and may determine the lower limit of the static cadence window by subtracting the static cadence offset identified in act 904 from the target cadence identified in act 902.

In act 908, the processor identifies a cadence at the crank arm of the bicycle. For example, a cadence sensor of the bicycle may generate cadence data for the crank arm, and transmit the generated cadence data to the processor. The processor may identify the cadence at the crank arm of the bicycle based on the cadence data generated by the cadence sensor. The processor may identify the cadence at the crank arm in additional and/or different ways.

In act 910, the processor identifies a torque at the crank arm of the bicycle, a speed of the bicycle, an acceleration of the bicycle, or any combination thereof. For example, a torque sensor of the bicycle may generate torque data, a speed sensor of the bicycle may generate speed data, an acceleration sensor of the bicycle may generate acceleration data, or any combination thereof, and the generated data may be transmitted to the processor. The processor may identify the torque, the speed, the acceleration, or any combination thereof based on the transmitted data. The processor may identify the torque, the speed, the acceleration, or any combination thereof in additional and/or different ways.

In act 912, the processor identifies a riding scenario of the bicycle. For example, the processor identifies the riding scenario of the bicycle based on the cadence identified in act 908, the torque identified in act 910, the speed identified in act 910, the acceleration identified in act 910, or any combination thereof. Other data (e.g., inclination data, vibration data) may be used to identify the riding scenario.

For example, the processor may identify a first riding scenario (e.g., trail conditions) based on the acceleration identified in act 910. The processor may identify the first riding scenario when, for example, the acceleration identified in act 910 changes between a negative acceleration (e.g., deceleration) and positive acceleration a predetermined number of times in a predetermined time period. As another example, the processor may identify a second riding scenario (e.g., road conditions) based on the cadence identified in act 908. The processor may identify the second riding scenario when, for example, the cadence stays within the static cadence window for a predetermined amount of time (e.g., without a shift being initiated). The first riding scenario may be on terrain (e.g., first terrain) that is technically more complex than terrain (e.g., second terrain) on which the second riding scenario is executed. The processor may identify the first riding scenario and/or the second riding scenario based on additional and/or different types of data. The processor may identify any number of other riding scenarios based on additional and/or different data.

In act 914, the processor compares the identified cadence at the crank arm of the bicycle to the static cadence window. For example, the processor may compare the identified cadence of the crank arm to the upper limit of the static cadence window, and determine when the identified cadence at the crank arm of the bicycle is greater than the upper limit of the static cadence window.

In act 916, the processor determines a dynamic offset based on the identified riding scenario. Automatic shifting reactance may be achieved by dynamic adjustment of the static cadence window determined in act 906. Under trail conditions, the dynamic offset (e.g., and debounce time) may be set to a greater value, which results in more resilient shifting. Under road conditions, the dynamic offset (e.g., and debounce time) may be set to a smaller value, which results in more reactive shifting.

The memory may store different dynamic offsets for different riding scenarios, respectively, within a lookup table. For example, the dynamic offset for the first riding scenario (e.g., a first dynamic offset) may be greater than the dynamic offset for the second riding scenario (e.g., a second dynamic offset). The processor may determine the dynamic offset based on the identified riding scenario using, for example, the lookup table.

In act 918, the processor adds the dynamic offset determined in act 916 to the static cadence window determined in act 906. For example, the processor adds the dynamic offset determined in act 916 to the upper limit of the static cadence window determined in act 906 when, based on the comparison in act 914, the cadence at the crank arm of the bicycle identified in act 908 is equal to the upper limit of the static cadence window. The adding of the dynamic offset in act 918 may avoid an automatic shift (e.g., as part of an automatic shifting algorithm) that may otherwise have been initiated.

At a time point at which the cadence at the crank arm of the bicycle identified in act 908 is equal to the upper limit of the static cadence window, for example, an initial offset corresponding to the dynamic offset determined in act 916 is added to the static cadence window determined in act 906, but this initial offset decays over time (e.g., over a debounce time). Debounce times may be stored with the dynamic offsets for the different riding scenarios, respectively, within the lookup table. Larger dynamic offsets allow the automatic shifting algorithm to be more resilient for short spikes in cadence window (e.g., an obstacle) and may be adjusted for every ride situation. In other words, large dynamic offsets and debounce times result in more resilient shifting (e.g., for trail riding), and small dynamic offsets and debounce times result in more reactive shifting (e.g., for road riding).

Figure 11:
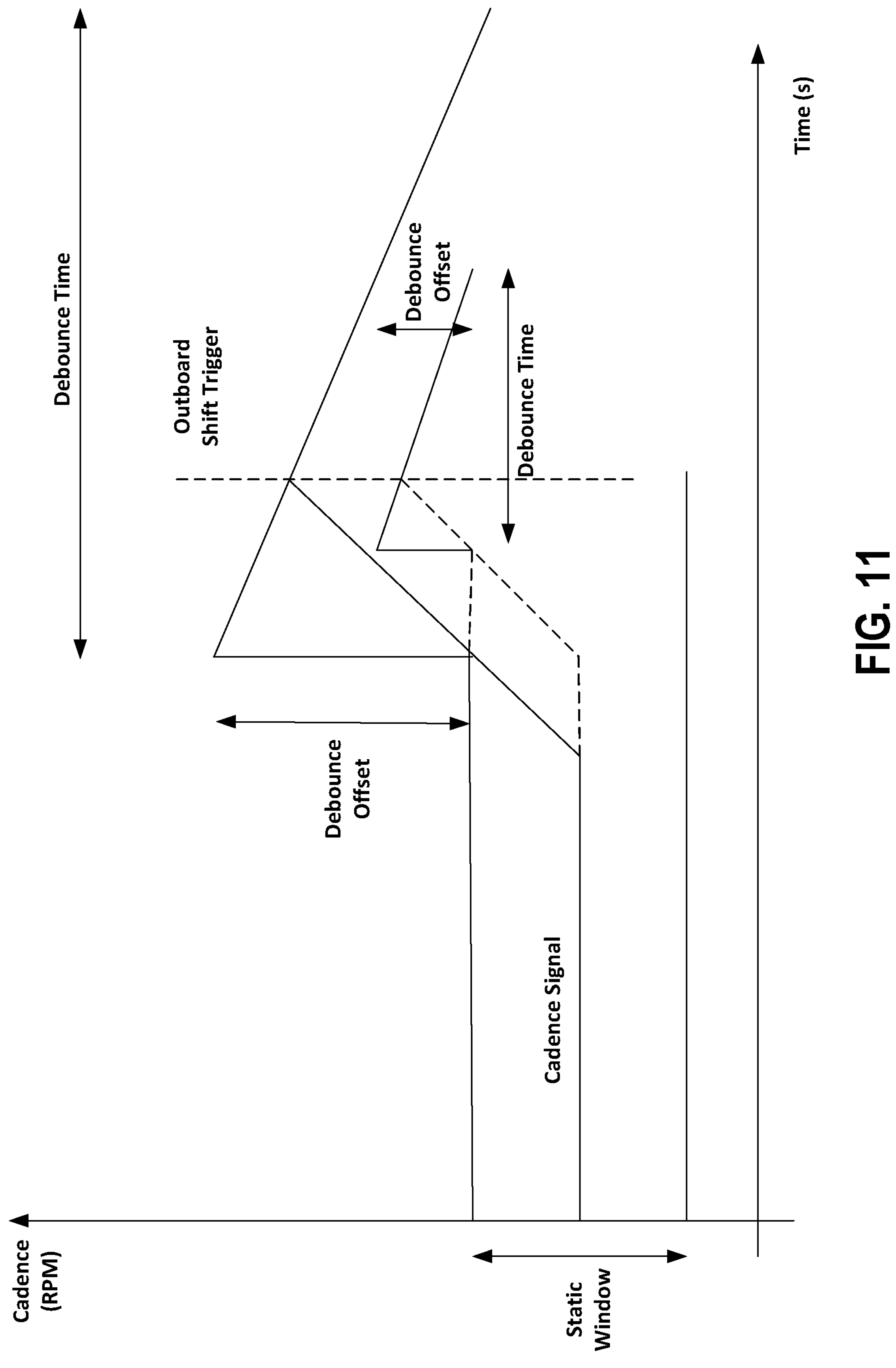
FIG. 11 illustrates an example of a dynamic target cadence window adjustment.

Referring to FIG. 11, the first riding scenario is shown with the solid line, and the second riding scenario is shown with the dashed line. Referring to the first riding scenario, when a cadence signal (e.g., from a cadence sensor) reaches an upper limit of the static window, the dynamic offset (e.g., debounce offset) is added to the upper limit of the static window. The dynamic offset decays over a time period (e.g., a debounce time), and the cadence signal eventually intersects with the decaying upper limit. The processor triggers an outboard shift when the cadence signal is equal to decaying upper limit. Referring to the second riding scenario (e.g., the dashed line), the dynamic offset is smaller, and the debounce time is shorter.

Figure 12:
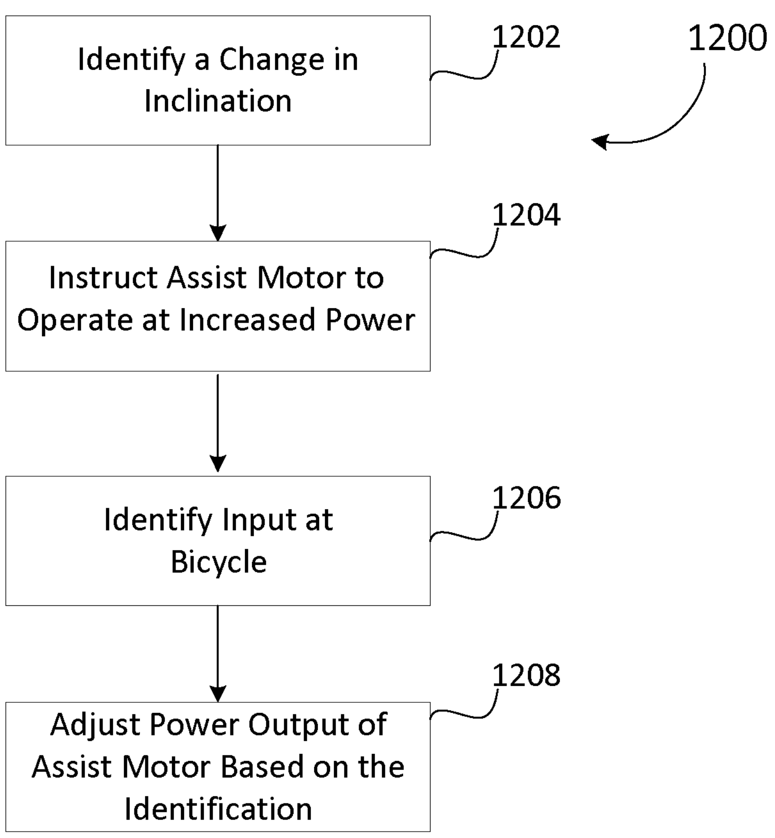
FIG. 12 is a flowchart of yet another embodiment of a method for controlling one or more components of a bicycle.

FIG. 12 is a flowchart of an embodiment of a method 1200 for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

Figure 13:
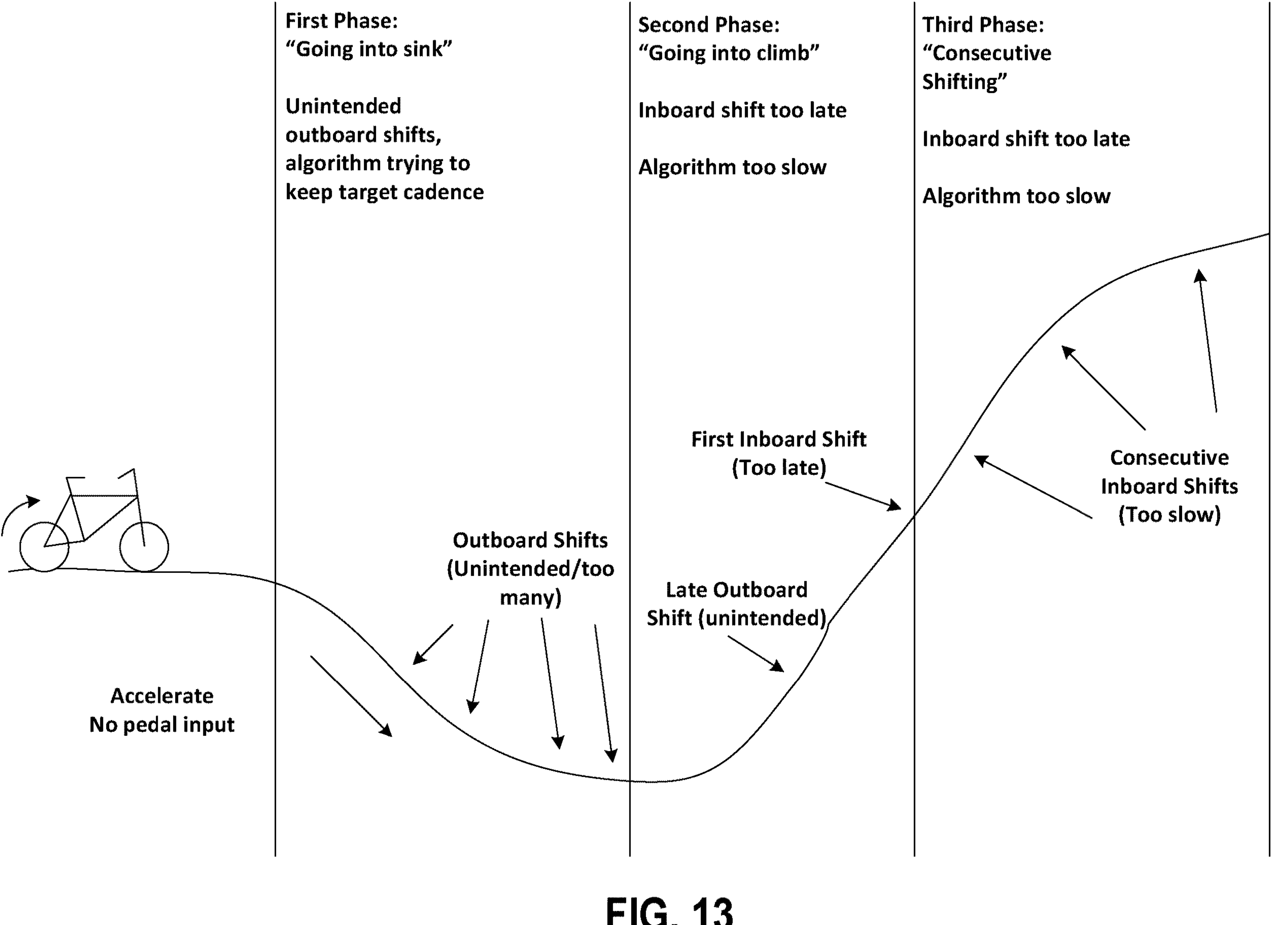
FIG. 13 illustrates phases of a G-out trail condition.

Referring to FIG. 13, within a specific trail condition referred to as a G-out, a rider of the bicycle experiences a sudden steep decline on a trail, which is identified as "1st Phase" in FIG. 13. A bicycle executing an automatic shifting algorithm may identify a sudden increase in speed, and a processor of the bicycle may instruct a derailleur (e.g., a rear derailleur) of the bicycle to shift into a higher gear to reduce pedaling cadence to a target cadence. The sudden increase in speed allows a drivetrain of the bicycle to move faster, thus allowing a number of shifts to occur very quickly. When a next phase of the trail (e.g., "2nd Phase") is a steep sudden incline, the bicycle quickly decelerates. The deceleration may be so abrupt that shifting into a lower gear does not keep up, resulting in a reduced cadence and a reduced speed in shifting. The rider is then in a "3rd Phase" of the trail, in which the bicycle is moving too slowly to rapidly shift gears. The loss of momentum may be regained after the bicycle is shifted into a low enough gear that acceleration may begin again.

The method 1200 attempts to aid the rider in recovering from the deceleration of the G-out trail condition by utilizing an assist motor of the bicycle (e.g., the electric bicycle). The method 1200 automatically detects the G-out trail condition and provides a temporary power boost from the assist motor of the electric bicycle to aid in keeping the speed of the bicycle up in "Phase 2" and "Phase 3" in order to effectively shift into needed lower gears.

In act 1202, a processor identifies a change in inclination of a surface on which the bicycle is operating (e.g., being ridden by the rider). The change in inclination is from a decline to an incline. In one embodiment, the processor may receive inclination data from an inclination sensor (e.g., a gyroscope) of the bicycle, for example, and the processor may determine the change in inclination based on the received inclination data. In another embodiment, the processor may receive distance data from a laser distance measurement sensor, and may identify the change in inclination based on the received distance data. The laser distance measurement sensor is configured to measure a distance from the bicycle to a point in front of the bicycle. Since an angle of the laser and the bicycle remain the same at all times, if a length of the laser from the bicycle to the ground on which the bicycle operates decreases, the terrain is becoming steeper uphill. If the length of the laser from the bicycle to the ground increases, the terrain is becoming steeper downhill.

In act 1204, the processor instructs an assist motor of the bicycle to operate at an increased output power based on the change in inclination identified in act 1202. In one embodiment, the processor instructs the assist motor of the bicycle to operate at the increased output power for a predetermined period of time. The predetermined period of time may be stored in a memory in communication with the processor, and may have an initial value. The predetermined period of time may be changeable by, for example, the rider.

In another embodiment, the processor identifies a current gear in which the bicycle is being operated, identifies a target gear identified by an automatic shifting algorithm, and instructs the assist motor to operate at the increased output power until the current gear matches the target gear.

In yet another embodiment, the processor may control the output power of the assist motor based on a combination of two or more factors such as, for example, distance, GPS position, cadence, speed, rider input torque, rider input power, one or more other factors, or any combination thereof. For example, as the rider input torque decreases, the bicycle may be approaching the target gear, and the increased output power may be removed or reduced.

In act 1206, the processor identifies user input at the bicycle. For example, the processor may identify depression of a brake control device of the bicycle, a manual shift override, or a trail condition. Different user inputs or sensed conditions may be identified by the processor in act 1206.

In act 1208, the processor stops the assist motor from operating at the increased output power, adjusts the output power of the assist motor, or adjusts a time for the increased output power based on the user input or sensed condition identified in act 1206. For example, if the brake control device of the bicycle is used (e.g., depressed), the processor may disable the increased output power. As another example, a rough trail or a slippery trail may extend or decrease the time for the increased output power. As yet another example, the activation of the manual shift override may affect a value or a duration of the increased output power.

The increased output power of the assist motor may be added or removed in a manner that is abrupt or gradual. For example, the full increased output power may be needed immediately as the bicycle decelerates, but as the bicycle speeds up, the increased output power may decay gradually so as to not stall the bicycle.

Figure 14:
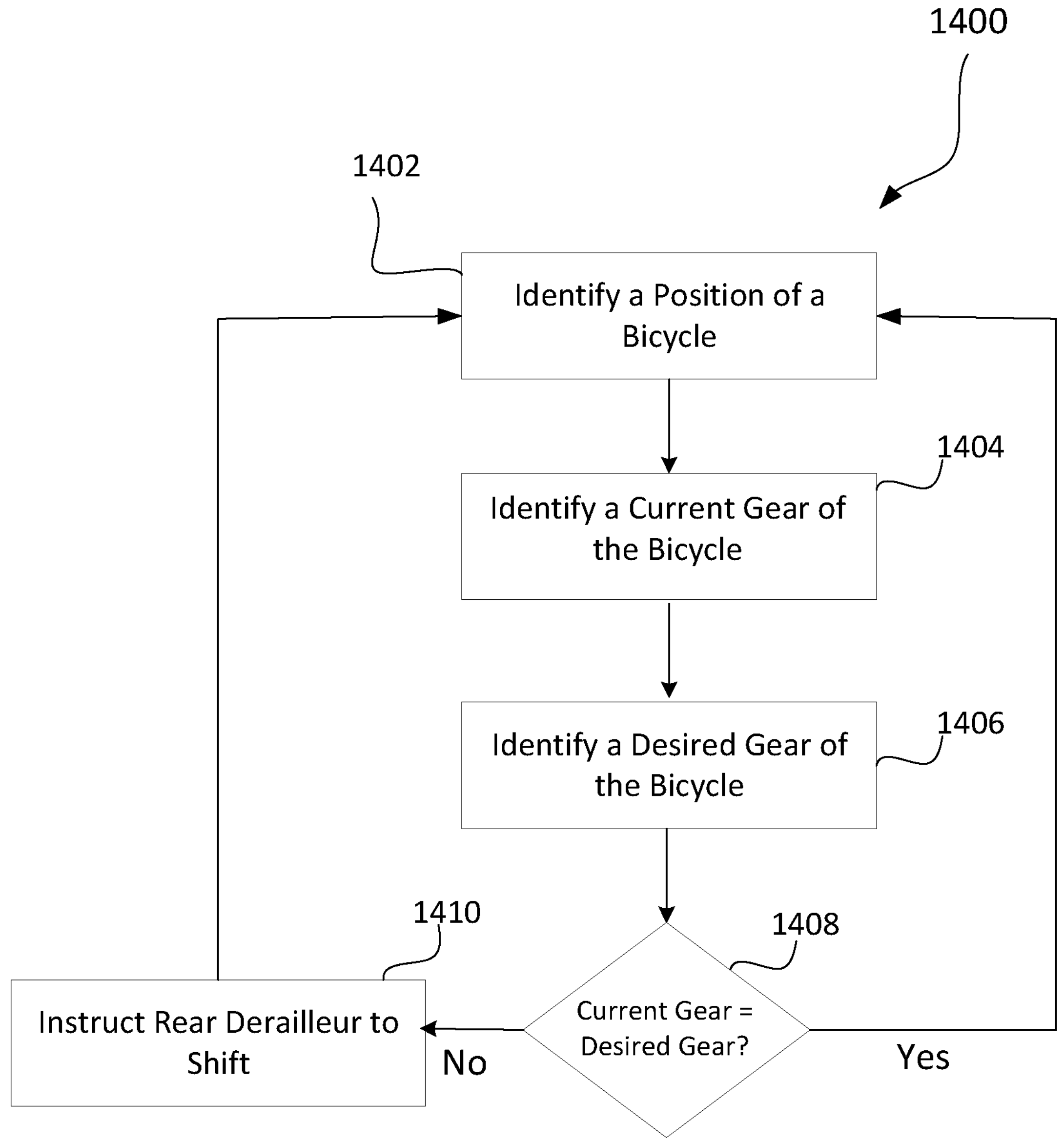
FIG. 14 is a flowchart of another embodiment of a method of controlling one or more components of the bicycle

FIG. 14 is a flowchart of an embodiment of a method 1400 for electromechanical control of components of a bicycle (e.g., the bicycle 100). As presented in the following sections, the acts may be performed using any combination of the components indicated in previous figures. For example, the following acts may be performed by at least some components of the control system 300, as well as additional or other components. In an embodiment, the acts may be performed by, for example, the rear derailleur 138, the e-bike controller 302, the power assist device 140, the one or more sensors, or any combination thereof. Additional, different, or fewer acts may be provided. The acts are performed in the order shown or in other orders. The acts may be repeated.

In downhill applications (e.g., a downhill course), few shifts may occur (e.g., automatically and/or based on inputs). The few shifts do, however, take rider fucus and control away from the downhill course. Any manual shifting requires awareness of an actual gear and a desired gear. Further, to execute a manual shift, the rider may need to at least partially relieve grip of the handlebars of the bicycle. Shifting controls take up space on the handlebars and add weight to the bicycle.

The method 1400 automates drivetrain control (e.g., control of shifting of a rear derailleur of the bicycle). Downhill courses may consist of extended sections (e.g., a first subset of pedal sections) where no pedaling is necessary or even possible, and sections where the rider is to pedal as hard as possible within a desired gear (e.g., a second subset of pedal sections). Based on practice runs, the rider knows which gear she needs on each of the pedal sections.

In act 1402, a processor of the bicycle identifies a position of the bicycle. In one embodiment, the processor identifies the position of the bicycle in a number of different ways. For example, the processor may identify an absolute position of the bicycle and/or a relative position of the bicycle. The relative position of the bicycle may be with respect to a starting point on the downhill course.

The processor may identify the position of the bicycle from sensor data from one or more sensors (e.g. of the bicycles and/or off the bicycle). The one or more sensors may include, for example, a GPS sensor. The GPS sensor may generate location data for the bicycle based on signals received from GPS satellites at a predetermined rate. For example, the GPS sensor may generate location data for the bicycle once every second, though other update rates may be provided. The processor may identify the position (e.g., the absolute position) of the bicycle in act 1402 based on the location data generated by the GPS sensor.

Additionally or alternatively, the one or more sensors may include one or more accelerometers. The one or more accelerometers may generate acceleration data for the bicycle, and the processor may calculate a relative position (e.g., relative to a starting point on the downhill course) based on the generated acceleration data. For example, the processor may calculate change in position data (e.g., relative position data) based on a double integration of the acceleration data.

In one embodiment, the acceleration data generated by the one or more accelerometers (e.g., and the change in position data based thereon) may be used to validate course position based on the location data generated by the GPS sensor. For example, the processor may determine a first absolute position of the bicycle (e.g., at a predetermined interval such as once a second) based on the location data generated by the GPS sensor, and may determine a second absolute position of the bicycle (e.g., at the predetermined interval) based on information about the downhill course (e.g., known absolute locations at different distances along the downhill course) and the change in position data generated based on the acceleration data generated by the one or more accelerometers. The processor may determine whether the first absolute position matches the second absolute position (e.g., within a predetermined percentage). When the first absolute position matches the second absolute position, the processor may identify the first absolute position as the position of the bicycle in act 1402. When the first absolute position does not match the second absolute position, the processor may identify the second absolute position or another position calculated based on other data as the position of the bicycle in act 1402. The validation using the acceleration data generated by the one or more accelerometers may avoid error from poor signal quality in a forest through which, for example, the downhill course extends.

In one embodiment, the processor may identify the position of the bicycle (e.g., within the downhill course) based on, for example, information about the downhill course and other sensor data. For example, the information about the downhill course may identify different sections within the downhill course with different inclinations (e.g., a first section that is flat, a second section with a gradient of 10%, a third section that is flat, a third section with a gradient of 15%, a fifth section that is a jump), and the processor may identify inclination data for the bicycle from, for example, an inclination sensor and/or acceleration data from one or more accelerometers of the bicycle. For example, the processor may compare the inclination data to the information about the downhill course and identify when the bicycle transitions between different sections based on the comparison. The processor may identify the position of the bicycle in act 1402 as the section within the downhill course (e.g., as defined by the information about the downhill course).

In act 1404, the processor identifies a current gear in which the bicycle is being operated. For example, the processor identifies a current gear of the rear derailleur in which the bicycle is being operated. The processor may control shifting (e.g., via an automatic shifting algorithm and/or in response to input at the bicycle) of the rear derailleur of the bicycle, for example, and may store data identifying a current gear of the rear derailleur after every shift within a memory of the bicycle. The memory may be in communication with the processor, and the processor may identify the current gear from the stored data. The processor may identify the current gear in other ways.

In act 1406, the processor identifies a desired gear based on the position of the bicycle identified in act 1402. During a trial run on the downhill course, for example, the processor may identify gear changes, a position of the bicycle at which each of the gear changes occurs (e.g., based on the location data generated by the GPS sensor), and a gear into which the bicycle is being shifted (e.g., historical data). The processor may also identify location ranges along the downhill course during which the derailleur does not change gears. Each of the location ranges may be defined by location endpoints (e.g., defined by a position of the bicycle when a gear change is initiated and a position of the bicycle when a next gear change is initiated for the respective location range).

The rider may execute multiple trial runs and save data (e.g., the historical data) for one of the trial runs (e.g., a best run) in the memory. The saved data may include locations for gear shifts, a gear being shifted into after each of the gear shifts, gears corresponding to location ranges, and/or other data. For example, a first location range (e.g., defined by a starting position of the bicycle at a beginning of the downhill course and a position of the bicycle at which a first gear shift occurs) and a corresponding gear for the bicycle that remains unchanged as the bicycle moves through the first location range are stored in the memory. A second location range (e.g., defined by the position of the bicycle at which the first gear shift occurs and a position of the bicycle at which a second gear shift occurs) and a corresponding gear for the bicycle that remains unchanged as the bicycle moves through the second location range are stored in the memory. A third location range (e.g., defined by the position of the bicycle at which the second gear shift occurs and a position of the bicycle at which a third gear shift occurs) and a corresponding gear for the bicycle that remains unchanged as the bicycle moves through the third location range are stored in the memory. The historical data may include more (e.g., a fourth location range, a fifth location range, a sixth location range, etc.), less, and/or different data.

The processor may identify the desired gear in act 1406 by comparing the position of the bicycle identified in act 1402 to the historical data. For example, the processor may determine which location range of the historical data the position of the bicycle identified in act 1402 is within, and may identify the gear that corresponds to the determined location range (e.g., stored in the memory) as the desired gear in act 1406.

The desired gear may be determined in other ways. For example, during the best trial run, the processor may store, in the memory, every predetermined time period (e.g., every second), a position of the bicycle based on the location data and a corresponding gear in which the bicycle is operated at the position (e.g., as historical datasets) as the bicycle travels along the downhill course. The processor may compare the position of the bicycle identified in act 1402 to the stored historical datasets and may identify a position of the bicycle within the stored historical datasets closest to the position of the bicycle identified in act 1402. The processor may then identify the gear that corresponds to the identified position of the bicycle within the stored historical datasets as the desired gear in act 1406.

In act 1408, the processor determines whether the desired gear identified in act 1406 is the same as the current gear identified in act 1404. If the processor determines the desired gear identified in act 1406 is the same as the current gear identified in act 1404, the method 1400 returns to act 1402, and the method 1400 is repeated for, for example, the next identified position of the bicycle. If the processor determines the desired gear identified in act 1406 is not the same as the current gear identified in act 1404, the method moves to act 1410.

In act 1410, the processor instructs the rear derailleur to shift to the desired geared identified in act 1406. After act 1410, the method 1400 returns to act 1402, and the method 1400 is repeated for, for example, the next identified position of the bicycle.

The processor knowing where on the downhill course the bicycle is located, combined with the historical data, may be used for more than gear selection. For example, such information may also be used to control a device to decouple a drivetrain (e.g., located in a chainring spider or a freehub). The method 1400 may be used for more than a downhill course. For example, the method 1400 may be applied to any type of riding on a known course.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method for controlling shifting of a bicycle, the method comprising:

identifying, by a processor, a first gear shift command, a source of the first gear shift command being a control device of the bicycle;

determining, by the processor, a first shift direction based on the first gear shift command;

initiating, by the processor, a first shift of the bicycle in the first shift direction based on the first gear shift command;

identifying, by the processor, a second gear shift command, a source of the second gear shift command being the processor or another processor, the second gear shift command being after the first gear shift command;

determining, by the processor, a second shift direction based on the second gear shift command;

determining, by the processor, a time period between the identifying of the first gear shift command and the identifying of the second gear shift command;

comparing, by the processor, the determined time period to a predetermined time period;

when, based on the comparing, the determined time period is less than the predetermined time period:

initiating, by the processor, a shift of the bicycle in the second shift direction when the second shift direction and the first shift direction are a same shift direction; and blocking, by the processor, the shift of the bicycle in the second shift direction when the second shift direction and the first shift direction are different shift directions.

2. The method of claim 1, wherein identifying the second gear shift command comprises generating, by the processor, the second gear shift command based on an automatic shifting algorithm.

3. The method of claim 1, wherein identifying the first gear shift command comprises receiving, by the processor, the first gear shift command from the control device of the bicycle in response to a user input at an input device of the control device of the bicycle.

4. The method of claim 1, further comprising starting a timer after the identifying of the first gear shift command, wherein determining the time period comprises determining the time period based on the timer.

5. The method of claim 4, further comprising:

when, based on the comparing of the determined time period to the predetermined time period, the determined time period is less than the predetermined time period:

determining a cadence of a crank arm of the bicycle;

comparing the determined cadence of the crank arm to a cadence setpoint, the comparing of the determined cadence of the crank arm to the cadence setpoint comprising determining a difference between the determined cadence of the crank arm and the cadence setpoint;

comparing the determined difference to a predetermined threshold difference;

removing the blocking when, based on the comparing of the determined difference to the predetermined threshold difference, the determined difference is greater than the predetermined threshold difference, such that the shift of the bicycle in the second shift direction when the second shift direction and the first shift direction are different is allowed.

* * * * *